United States Patent [19]

Akkerman

[11] 4,187,870
[45] Feb. 12, 1980

[54] VALVE ACTUATOR AND PILOT ASSEMBLY THEREFOR

[75] Inventor: Neil H. Akkerman, New Orleans, La.

[73] Assignee: Baker International Corporation, Orange, Calif.

[21] Appl. No.: 930,462

[22] Filed: Aug. 3, 1078

Related U.S. Application Data

[62] Division of Ser. No. 794,571, May 6, 1977, Pat. No. 4,157,167.

[51] Int. Cl.² .................... G05D 7/00; F16K 31/124
[52] U.S. Cl. .................................. 137/102; 137/458; 137/488; 251/28; 251/63; 251/63.6
[58] Field of Search ............. 137/102, 458, 459, 460, 137/461, 488; 251/28, 63, 63.5, 63.6, 318, 326

[56] References Cited

U.S. PATENT DOCUMENTS

| | | | |
|---|---|---|---|
| 2,566,774 | 9/1951 | Otis | 137/461 |
| 3,007,492 | 11/1961 | Grimmer | 137/488 |
| 3,049,140 | 8/1962 | Thornhill et al. | 137/458 |
| 3,083,726 | 4/1963 | Woelfel | 137/458 |
| 3,115,330 | 12/1963 | Dollison | 251/63.6 |
| 3,389,718 | 6/1968 | Johnson et al. | 137/458 |
| 3,540,690 | 11/1970 | Brown | 137/458 |
| 3,621,881 | 11/1971 | Vicari | 137/458 |
| 3,958,592 | 5/1976 | Wells et al. | 251/63.6 |
| 4,078,073 | 5/1978 | Runberg et al. | 137/458 |

*Primary Examiner*—Martin P. Schwadron
*Assistant Examiner*—G. L. Walton
*Attorney, Agent, or Firm*—William C. Norvell, Jr.

[57] ABSTRACT

A valve actuator and a pilot assembly which may be utilized either alone or with the actuator is responsive to control fluid pressure for moving an operative means of a valve between open and closed positions. The actuator has a housing defining a cylindrical bore therethrough and a shaft is carried in the housing which is engageable with the operative means. A piston is carried by one of the shaft and the housing and is sealingly slidable along the other of the shaft and the housing and is longitudinally movable within the cylindrical bore.

The pilot assembly comprises a cylindrical housing having pilot means within the housing, the pilot means having valve seat means thereon. Normally free traveling spherical members are provided immediate the pilot means and define valve head means selectively sealingly engageable on the pilot means to open and close the pilot means to control fluid flow therethrough. A pilot spool within the housing and immediate the pilot means and operably associatable with the pilot means and the spherical members permits selective movement of the spherical members to the immediate vicinity of the valve seat means of the pilot means. The spool is manipulatable in at least one of linear and rotary directions. Fluid flow causes the spherical members to seek and selectively seal onto the valve seat means. The spool is selectively shiftable in response to variation of fluid pressure to permit the fluid pressure to act within the actuator to manipulate the operative means between open and closed positions. A stem extension is provided within the actuator housing and is engaged to the spool, together with resisting means, such as compressible springs and the like, within the housing and are carried around the stem for resisting travel of the spool in one direction. Differential pressure areas are defined across the spool and are responsive to fluid pressure variance to selectively overcome travel resistance of the spool by the resistance means and to thereafter shift the spool.

17 Claims, 19 Drawing Figures

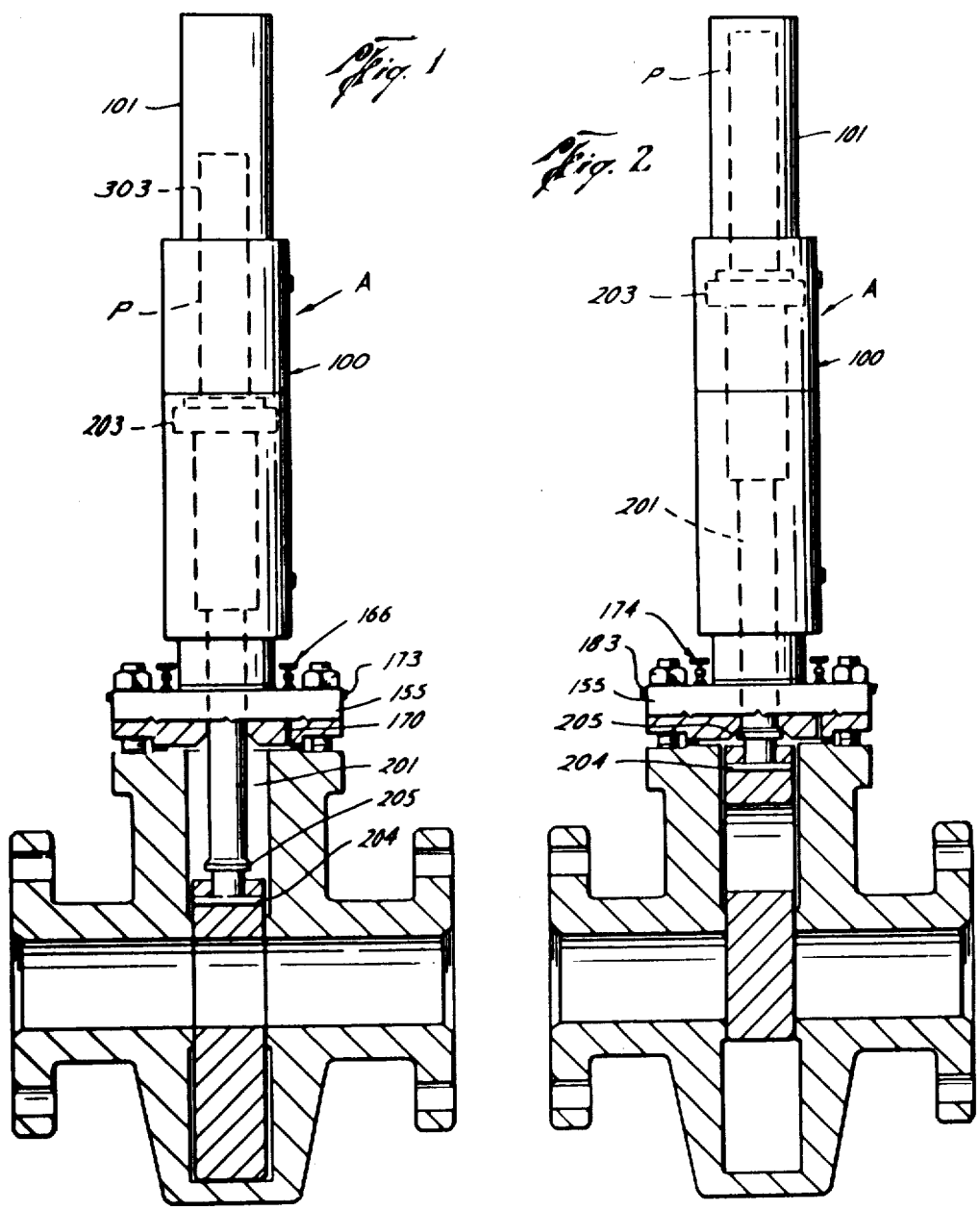

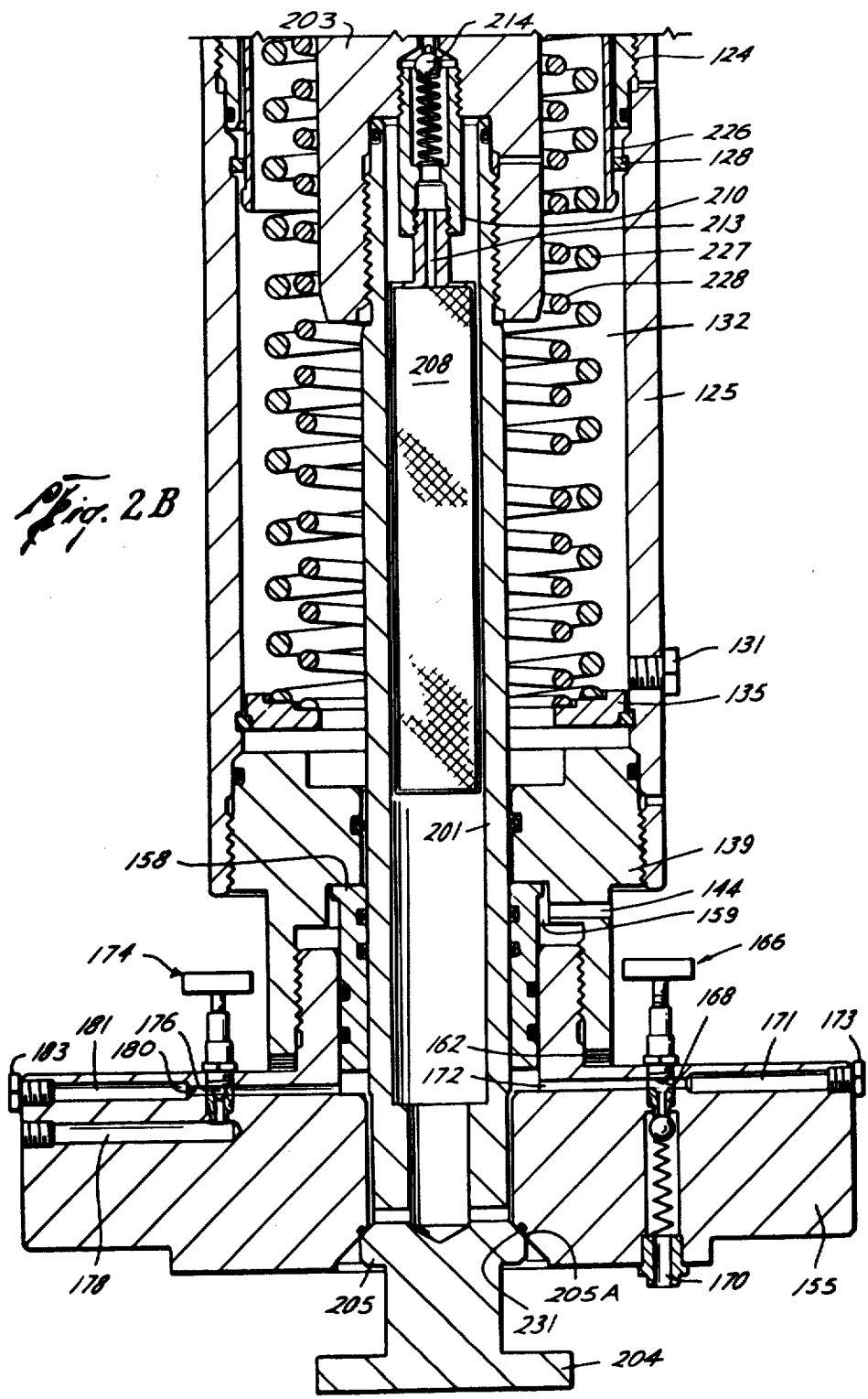

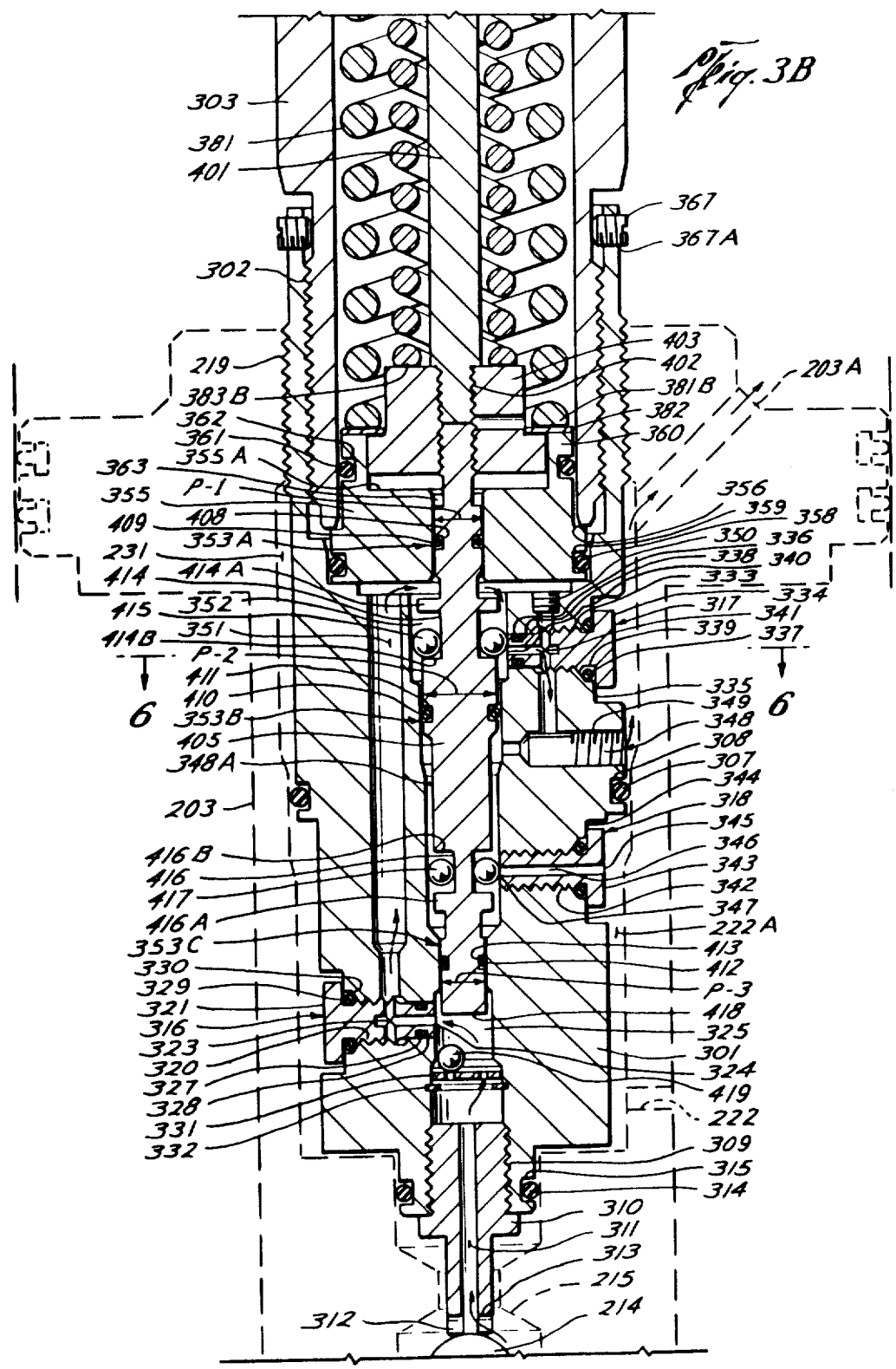

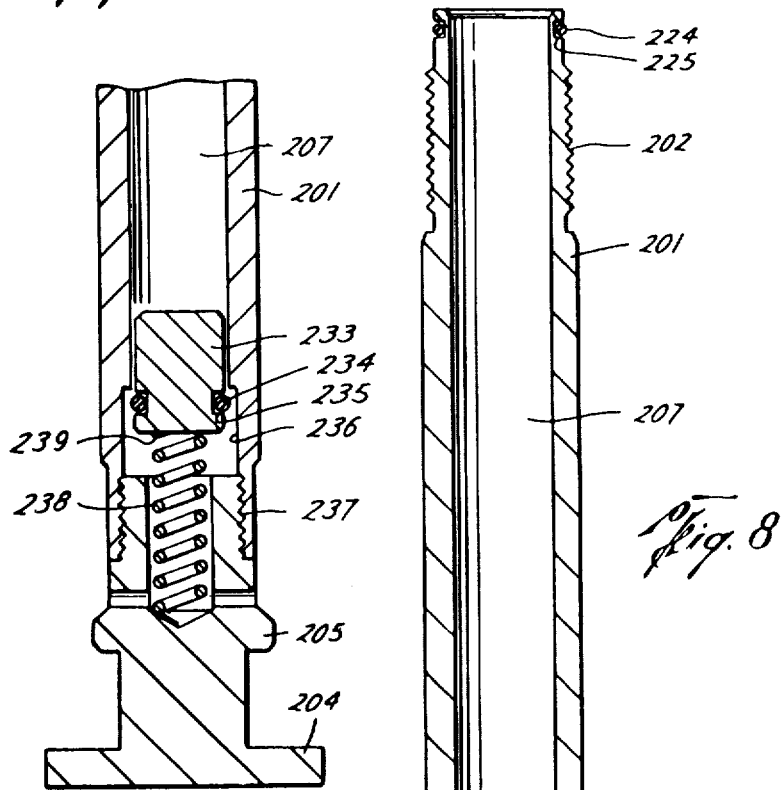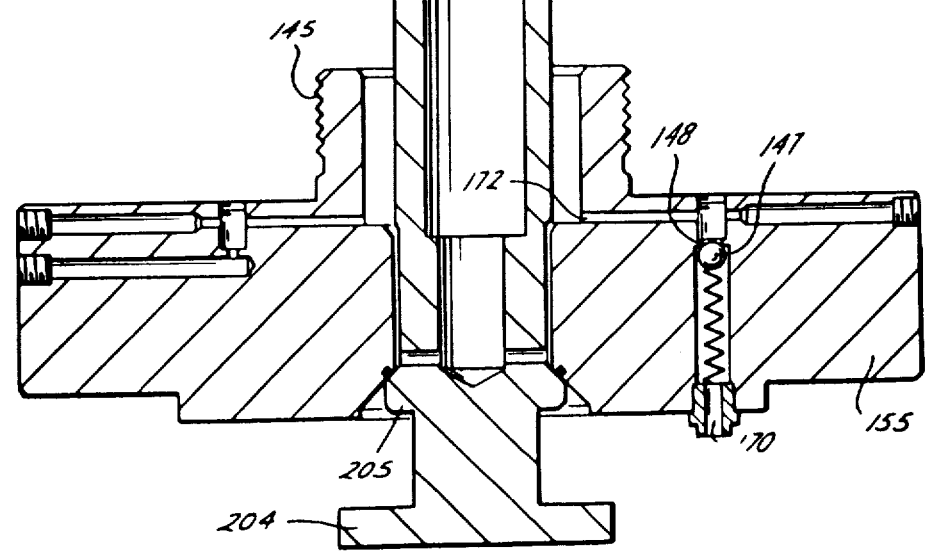

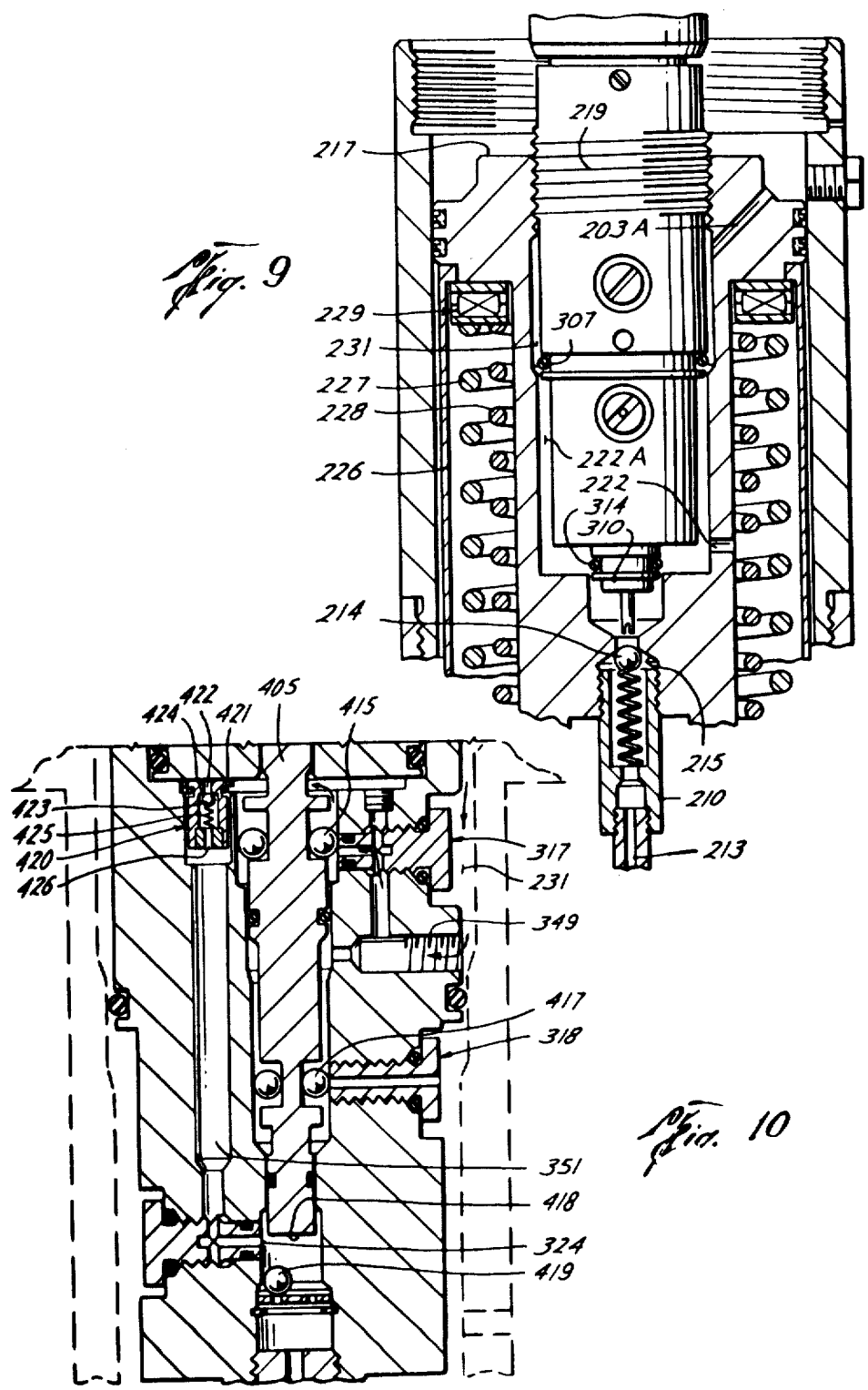

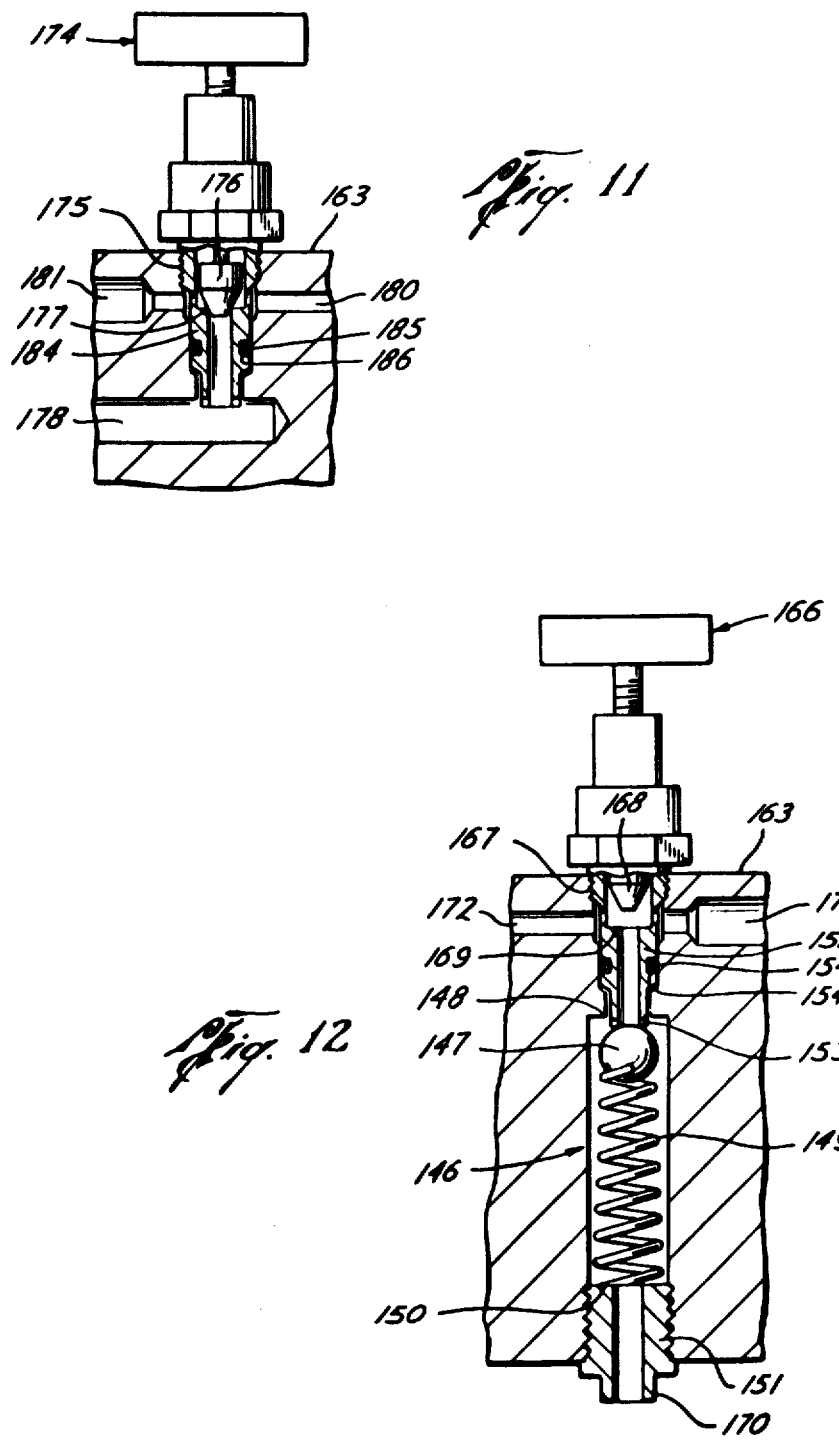

VALVE ACTUATOR AND PILOT ASSEMBLY THEREFOR

CROSS-REFERENCE TO RELATED APPLICATION

This application is a divisional application of copending Ser. No. 794,571, filed May 6, 1977, entitled "Valve Actuator And Pilot Assembly Therefor, now U.S. Pat. No. 4,157,167.

BACKGROUND OF THE INVENTION

1. Field of the Invention

The present invention relates to an actuator for moving an operative means of a valve between open and closed positions. Additionally, the invention relates to a pilot assembly for manipulation of the operative means in response to pressure variances.

2. Description of the Prior Art

Valve actuators are utilized to manipulate an operative means, such as a stem, of a valve mechanism on a flow line into open and/or closed position in response to control pressure variation. Normally, such actuators comprise a shaft and a fluid activated mechanism in association therewith which, upon activation thereof by variation in control pressure, causes longitudinal movement of the shaft to shift the valve head in relation to its seat to move the valve to open or closed position. Venting of control pressure within the actuator will cause a subsequent longitudinal shifting of the shaft and the valve head to a second position to the other of open and closed position. Such actuators and valves are frequently utilized in safety systems used in conjunction with the drilling, completion and production of oil and gas wells. They are also utilized in natural gas transmission lines, and the like.

Valve actuators may be classified into two basic classifications: (1) those which are of necessity manipulatable only in response to pressure variation supplied through a pressure source other than that directly within the flow or transmission line; and (2) those which are manipulated by control fluid variance, the control fluid being tapped directly from the flow or transmission line itself. Because it is impractical to supply an independent fluid source for actuator control purposes on long and isolated transmission lines on valves selectively placed along the flow or transmission line in isolated environments and areas, an actuator as described in the second classification above is preferably utilized; namely, one which is responsive to variance in the flow or transmission line pressure itself to manipulate the valve between open and closed position. These actuators, sometimes referred to as "in-line" actuators, are well known in the prior art and may have a fluid transmission line exterior of the actuator housing and connected with the flow or transmission line either upstream or downstream of the valve to be manipulated by an external pilot. This feature is somewhat disadvantageous because it is cumbersome and is subject to vandalism or unintentional damage to render the actuator inoperative or unsafe.

During the transmission of liquid or gaseous fluids within a flow or transmission line, it often occurs that pressure within the line will vary either above and/or below the normal operating pressure because of, for example, a break or leak in the line either upstream or downstream of the valve manipulated by the actuator, or because of clogging of contaminant, such as paraffin and scale within the line, which may become sufficient to cause a pressure increase within the line beyond the normal operating pressure range. Therefore, an actuator should be utilized which is responsive to either an increase or a decrease in line pressure beyond normal operating pressure range to manipulate the valve and isolate the line upstream and downstream thereof. Heretofore, such an "in-line" actuator has been technically and commercially successful only on a comparatively limited scale because the design of such prior art actuators has, of necessity, required the utilization of multi-valve means in the actuator which could be manipulated to open and close flow passageways therethrough to cause the actuator to shift the valve operative means to move the valve to one of open and closed positions. Because of substantial friction caused by pressure differentials, the prior art valving means utilized in such an actuator are somewhat unreliable, cumbersome and inaccurate in sensing pressure. The present invention overcomes these obstacles common to the prior art by providing an actuator having a pilot assembly therein which utilizes a plurality of normally free traveling spherical members in association with pilot means therein having seal bores for sealing engagement thereon of one of said spherical members, which is caused to seek and seal thereon. The sealed spherical member subsequently is easily wipable off of its seal bore, even though substantial differential pressure may be encountered across the spherical member when on its seal seat, to permit fluid transmission therethrough by manipulation of a spool within the pilot assembly which itself is responsive to valve body pressure. The sphere has an inherent mechanical advantage determined by the relationship of sphere-to-port diameters and is frictionless inasmuch as the ball rolls off of its port.

There may be need, from time-to-time, to remove a pilot from an actuator for repair or replacement purposes while the actuator is in operation on a flow or transmission line. The valve must be shifted to closed position on the flow line and, heretofore, necessitating considerable down time. This obstacle is overcome in the present invention by providing a means for quickly, but safely, removing the pilot assembly from the actuator while well or flow line pressure is held within the actuator and is not vented to atmosphere. The present pilot assembly may be repaired or replaced and quickly reinserted into the actuator without loss of control of flow line or well pressure through the actuator.

As an actuator is broken down on location to repair or replace components, it is possible for parts of a prior art actuator to be threadedly disengaged from companion parts while well or flow line pressure within the actuator is still "live" and within the actuator. To avoid pressure and disengaged parts from being explosively discharged into the face of a service man, or around the environment exterior of the actuator, the present invention provides O-ring and bleed port means operative in conjunction with the threads at part connections to carefully and controllably vent live pressure to atmosphere and directly away from the service man before any threaded part becomes disengaged sufficient for the part and pressure to become explosively discharged.

Also in association with the disassembly of an actuator on location, there is need to provide a means for controlling flow line or well pressure within a minimal number of actuator components. The actuator of the present invention permits almost complete disassembly of its respective component parts while the flow line valve is in closed position by providing a resilient seal or "fire seal" and seat which maintains flow line pressure on only the actuator stem and housing while other component parts may be completely disassembled therefrom for repair or replacement purposes. The present actuator may be completely disassembled for repair purposes without bleeding off the entire pipe or flow line, thus avoiding considerable flow line down time.

Many prior art actuators are not considered to be "fail safe", i.e., they do not incorporate power springs or other energy storage devices in the event of substantial loss of valve body pressure. The present actuator is entirely "fail safe" in its entire operating sequences, as will be described in detail hereinafter.

When prior art actuators sense an improper pressure environment within the flow line, the valve is closed and well or flow line pressure is vented to atmosphere through a bleed port, causing considerable pollution of the environment. The present actuator is completely non-polluting during all valve manipulation modes without venting fluid to atmosphere. This inventive feature is attributable to the incorporation of a pilot assembly which will shut the gate valve upon variation in well or flow line pressure by equalizing pressure across a piston contained within the actuator, as opposed to venting operating pressure to the atmosphere.

Prior art actuators have been provided which, after sensing a high pressure environment above normal flow line pressure and which trip the actuator to manipulate the valve to closed position, are not selectively functional thereafter to open the valve if pressure returns to within normal operating range. The present actuator overcomes this obstacle by providing a means for selective resetting of the actuator pilot to permit the actuator to be set to open the valve upon subsequent decrease of pressure from a high pressure environment to normal operating range. Alternatively, the actuator also may be set to prevent the valve from reopening when pressure is returned to normal after encountering a high pressure environment.

Previous actuators have been designed to be responsive to a pressure condition below normal operating pressure to manipulate the valve to closed position. Prior art actuators are typically non-automatically resettable after a low pressure condition is sensed and the flow or well line subsequently returns to within the normal operating range. However, none are known to be available to close the valve upon detection of a low pressure condition, as well as upon detection of a high pressure condition, and are selectively resettable after encountering a high pressure condition. These features are very practical and quite important because gate and similar valves utilized on flow lines normally seal on the downstream seat in the valve body. Differential pressure thus moves the gate to the far or downstream seal and pressure under the actuator bonnet in a closed gate valve is always defined as upstream pressure. If the flow line ruptures just downstream of a given flow line valve, pressure in that valve body will go to substantially zero and the actuator will sense a low pressure condition and close the valve. When the valve closes, pressure will return to within normal operating range under the bonnet and the pilot in the actuator will be urged to clear and open the valve. However, the present actuator is non-selective in resetting after sensing a low pressure condition. This feature is done internally and completely within the actuator without requirement of any mechanical means, such as detent pins or the like. Since the present actuator is fail safe, the valve automatically closes upon sensing a low pressure condition and will remain closed until manually reopened.

If an actuator is responsive to a pressure condition above the normal operating range, such that the valve is manipulated to closed position, and flow line pressure is contained within the actuator, the service man could not apply sufficient force manually through the actuator piston stem because of the increased well or flow line pressure exerted on the stem. The present invention provides a means for manually resetting the actuator after sensing a high pressure environment so that flow line pressure will again activate the pilot to cause the actuator to open the valve.

It occurs frequently that it is necessary to calibrate the pilot assembly of an actuator so that the valve on the flow line is manipulated to open and closed position at pressures above and below the originally set normal operating range. The present pilot assembly provides an easy and readily accessible means for calibration by providing a means thereon for receipt of a hand pump which simulates well or flow line pressure. In conjunction with a gauge mechanism inserted within the pilot assembly, the pilot is caused to mimic the actuator trip and reset modes by application of pressure through the hand pump to calibrate and adjust the pilot assembly, at pressures reflected on the gauge.

Other advantages and features of the present invention will be readily understandable from a reading of the drawings, the specification and claims, which follow.

SUMMARY OF THE INVENTION

The present invention defines a unique pilot assembly which is adaptable to pneumatic and hydraulic systems, and has particular utility in association with a valve actuator. When utilized in a gate valve actuator on, for example, a liquid hydrocarbon transmission line, the pilot assembly will permit fluids within the transmission line to pass through a filter to the top of a piston in the actuator which will cause compression of the actuator power spring to open the gate valve when transmission line pressure is within normal operating range. When the transmission line pressure is not within the normal operating range, the pilot assembly will block the fluids within the transmission line and will remove pressure from the top of the actuator piston, thus allowing the actuator power spring and pressure on the gate valve stem to close the valve.

The pilot assembly preferably contains a three position snapacting spool which is positioned by a balance of force between calibratable springs and piston areas. Preferably, the spool is manipulatable to up, neutral and down positions. When pressure within the pilot assembly is within normal operating range, the spool is in the neutral position to permit transmission line pressure to pass through a port in the bonnet stem, through the bonnet stem filter, through the supply pilot, thence through the spool to and through the low pilot assembly, and through passageways in the pilot assembly and the actuator and within a chamber to act on the top of the actuator piston. In the neutral position, an upper O-ring on the spool has pressure differential thereacross which resists force exerted on the spool by the calibratable control springs. Thus, the pilot assembly allows transmission line pressure to act on the actuator piston and hold the gate valve in the open position.

Immediate ports defined in the pilot assembly are camways filled with spherical elements. These spheres are free to move within their camways and exhibit a tendency to follow fluid flow. If the spool is shifted to permit the spheres to be in the vicinity of a given port, and there is flow through the pilot assembly, a sphere will become sealingly engaged onto the port.

If pressure within the transmission line is increased above the normal operating range, the uppermost piston area on the spool will be moved upwardly to compress the control springs and the spool will be shifted to the up position to permit free traveling spheres to be in the vicinity of the port on the high pilot assembly. The spool then causes a sealed sphere on the bleed pilot assembly to be wiped off of its seat or port, to initiate fluid flow out of the bleed port, this flow carrying a sphere near the high pilot assembly to sealing engaged position on the port or seat on the high pilot assembly, and fluid continues to be bled and removed from the top of the actuator piston enabling the bonnet stem piston force and the spring force to close the gate valve. When the spool is in the up position, pressure and fluid are contained at the high pilot assembly and across a lower piston area on the spool, resulting in no hydraulic piston effect change across the spool and allowing the spool to reset in the neutral position in the event that pressure returns to normal, or if the pilot assembly is reset by mechanical means.

If the spool is in the neutral position with the gate valve open and pressure within the transmission line falls below the normal operating range, the differential pressure defined across the uppermost O-ring on the spool will cause the spool to move downwardly and permit one of the control springs to expand. As the spool is shifted to the down position, it allows the free traveling spherical element to be moved to the vicinity of the port or seat on the low pilot assembly, and the sealed sphere on the bleed pilot assembly is wiped off of its seat, thus initiating flow of fluid through the pilot assembly. Fluid flows out of the bleed pilot assembly and carries a spherical element to sealing engagement upon the low pilot assembly while fluid continues to be bled from the top of the actuator piston to cause the bonnet stem piston force and spring force to close the gate valve. When the spool is in the down position, pressure is contained within the low pilot assembly and a third and larger spool differential area piston, resulting in a downward hydraulic piston effect whereby the spool is locked in the down position to prevent the spool from thereafter being shifted to the neutral position, unless done so mechanically.

The gate valve may be closed at any time by manual shifting of the pilot spool by placing a tripping rod, conveniently housed within the actuator above its rising stem, into the stem and prying either up or down on the stem with the rod. If the spool is raised, a high pressure condition is simulated and the valve may reopen when force is relieved. If the spool is lowered by the rod, a low pressure condition is simulated and the valve will be pressure locked in the closed position.

With the gate valve in the closed position, the pilot assembly may be removed without bleeding down the transmission line while the pilot assembly is disengaged from the actuator, because of the operation of a spring loaded check valve which is shifted to closed position by removal of the pilot assembly from the actuator housing to block transmission line pressure therebelow. An O-ring at the bottom of the pilot assembly will move out of its seal bore to permit venting of pressure within the actuator and the pilot assembly to permit checking of the operation of the check valve before completely removing the pilot assembly from the actuator.

A pressure gauge may be inserted into a port within the actuator and a pump may be connected to the bottom of the pilot assembly to permit repeatable actuation of the pilot assembly to adjust or calibrate the spring forces in the pilot assembly to vary the normal operating range of the transmission line.

Two manual needle valve assemblies on the actuator permit transmission pressure to be isolated from within the actuator when the gate valve is closed. A seal and seat defined across the lower end of the bonnet stem provides a static seal to control transmission line pressure when the actuator is disassembled. One needle valve assembly blocks supply of transmission pressure while the other needle valve assembly allows all pressure to be removed from a seal cartridge within the actuator to test the static seal on the bonnet stem.

To open the gate valve, pressure is permitted to be built up on top of the actuator piston by first opening the gate valve to bleed pressure from within the bonnet. Thereafter, the pilot spool is pried to the neutral position and a detent assembly is activated. Thereafter, the supply needle valve assembly is manipulated to open position. When pressure within the transmission line is within normal operating range, the stem of the pilot assembly will be moved slightly upwardly to release the detent pin and the pilot spool will be released. If the supply needle valve assembly is left in the open position, the pilot assembly will automatically reset if pressure returns to normal operating range after tripping at a high pilot condition. If the supply needle valve assembly is closed, the pilot assembly will not automatically reset.

The detent assembly is designed to aid a service man when mechanically activating the pilot assembly when the transmission line is at zero pressure. The detent assembly permits a service man to set the actuator and permit it to be responsive at low pressure conditions. The detent pin assembly will not lock out the pilot assembly after a high pressure condition has been sensed. Accordingly, if the gate valve is to be opened when high pressure conditions are encountered, the service man must be on actual location to mechanically actuate the pilot spool.

The pilot assembly and the actuator are intended to be used in remote locations where supervision is minimal and electrical, pneumatic or hydraulic supply is not available to power a control system. The devices are intended to operate with minimum maintenance and are designed such that all dynamic seals and all but one static seal may be replaced without requirement of bleeding the transmission line pressure in the valve body.

BRIEF DESCRIPTION OF THE DRAWINGS

FIG. 1 is a longitudinal sectional schematic view showing the actuator affixed onto a gate valve assembly, the gate of the valve being shown in open position.

FIG. 2 is a view similar to that shown in FIG. 1, the gate being shown in closed position to isolate flow upstream from downstream of the valve assembly.

FIGS. 2A and 2B are longitudinal sectional detailed views, similar to those shown in FIGS. 1A and 1B, illustrating the actuator in the position as shown in FIG. 2.

FIGS. 3A and 3B together constitute a longitudinal sectional detailed view of the pilot assembly with the pilot stem and spool in neutral position, the actuator and the gate of the gate valve being in the position shown in FIG. 1. The flow of pressure and fluid through the pilot assembly and the actuator is indicated by arrows.

FIG. 7 is a partial longitudinal view of the optional embodiment of a free floating compensating piston within the actuator bonnet stem.

FIG. 8 is a longitudinal sectional view of the actuator with its component parts being completely disassembled therefrom for repair or replacement, a seat on the actuator stem and an O-ring seal carried on the actuator body together with the check valve below the removed control needle valve assembly serving to control pressure within the flow line during the disassembly.

FIG. 9 is a partial longitudinal sectional view of the pilot assembly and actuator piston showing the relative position of the pilot assembly with respect to the piston while the pilot assembly is being threadedly disengaged therefrom for repair or replacement purposes, a ball being sealingly engaged on its seat on the actuator inner body to hold pressure within the actuator and below the pilot assembly.

FIG. 10 is a longitudinal sectional partial view of the pilot assembly of the actuator with the alternative embodiment of a reverse flow relief valve being utilized therein within a longitudinal flow passageway.

FIG. 11 is a longitudinal sectional view taken along lines 11—11 of FIG. 1B showing the seal seat configuration below the bleed needle valve assembly.

FIG. 12 is a longitudinal sectional view similar to that shown in FIG. 11, taken along lines 12—12 of FIG. 1B illustrating a check valve assembly immediately below the control needle valve assembly.

DESCRIPTION OF THE PREFERRED EMBODIMENTS

Figure 1A:
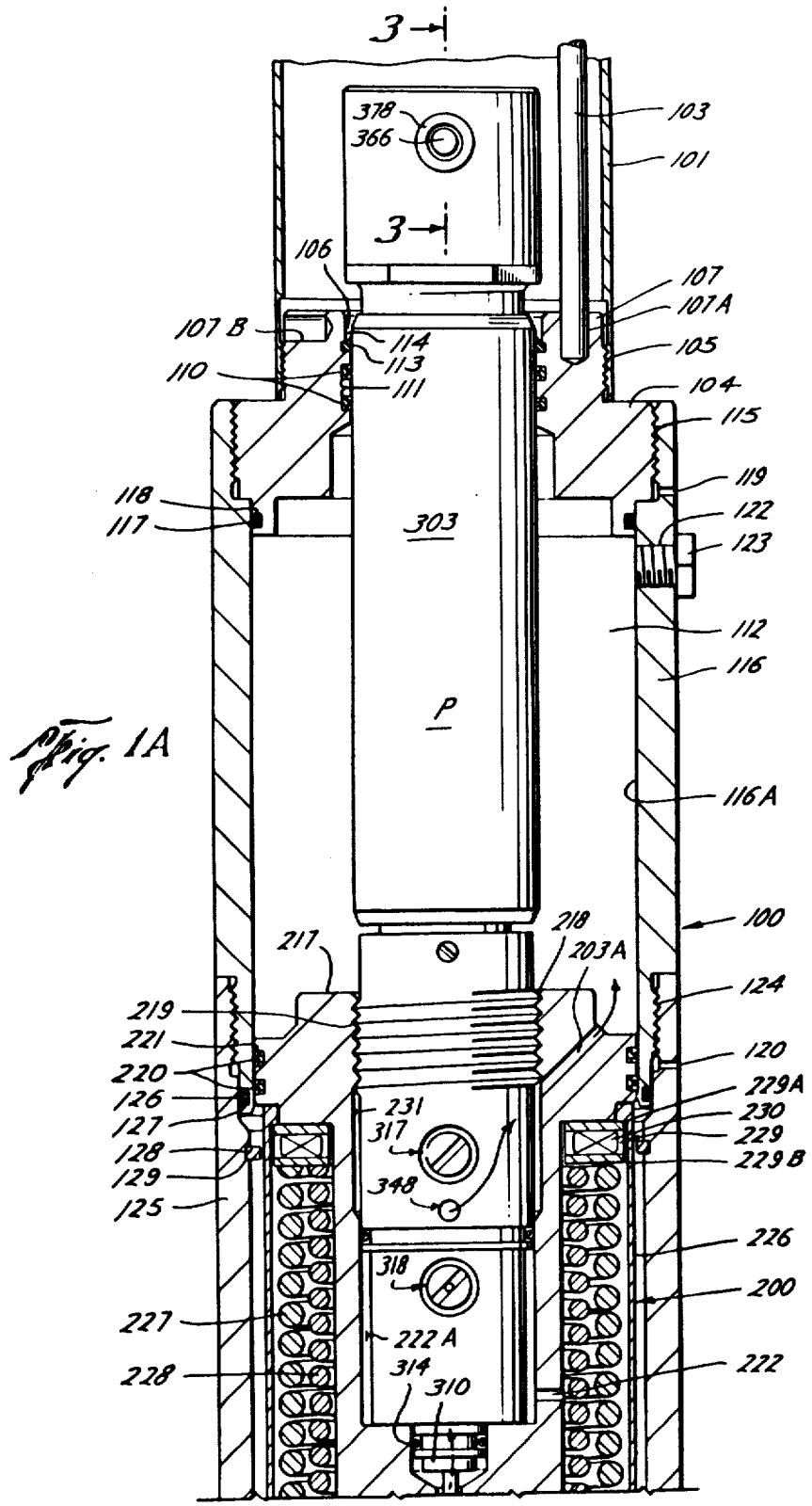
FIGS. 1A and 1B together are a longitudinal sectional view in detail of the actuator in the position as shown in FIG. 1.

The invention incorporates an actuator A and a pilot assembly P therein. The actuator A is comprised of an actuator housing 100 and an inner body 200 therein. The pilot assembly P comprises a housing 300 and an inner body 400 therein.

Referring to FIGS. 1A, 1B, 2A and 2B, the actuator housing 100 is defined at one end by an elongated cylindrical protector 101 having closed top 102. The protector 101 houses the uppermost portion of the pilot assembly P which moves longitudinally within the protector 101 when the gate valve is manipulated to open and closed positions. Additionally, the protector 101 houses a reset rod 103 utilized as described hereafter. The protector 101 is affixed to an end cap 104 by means of threads 105. The end cap 104 provides in the center thereof a bore 106 for insertion therethrough of the pilot assembly P. Additionally, the end cap 104 has through its upper face 107 a cylindrical bore 107A for receipt of the reset rod 103. The face 107 also has defined thereon a transverse bore 107B for receipt of an end of reset rod 103 in the event that it is desired to disassemble the actuator A or replace the actuator A and/or the pilot assembly P.

The bore 106 of the end cap 104 has defined therein a plurality of elastomeric T-seals 110 circumferentially extending within their grooveways 111 to prevent fluid communication between the end cap 104 and the pilot assembly P. Additionally, these T-seals 110 define the uppermost end of a high pressure piston chamber 112 therebelow. Immediate the bore 106 and on the end cap 104 is a circumferentially extending elastomeric wiper ring 113 within its grooveway 114 for the purpose of removing contaminant particulate from the exterior of the pilot assembly P during actuator manipulation.

The end cap 104 is affixed by threads 115 to a longitudinally extending cylindrical upper housing 116. An O-ring 117 housed within a grooveway 118 defined in the end cap 104 prevents fluid communication between the end cap 104 and the upper housing 116. A port 119 bored through the uppermost part of the housing 116 is companionly associated with the O-ring 117 and the threads 115, such that pressure contained within the high pressure piston chamber 112 is vented through the port 119 when the end cap 104 is being threadedly disengaged from the upper housing 116 during disassembly of the actuator A for repair and the like while the actuator A is still in operation, the port 119 venting the pressure contained within the chamber 112 to atmosphere prior to complete unthreading of the end cap 104 from the upper housing 116. Similar ports 120 and 121 serve the same function with their respective seals and threads, described below.

The upper housing 116 also has defined therethrough a threaded port 122 for normal receipt of a plug element 123 insertable therethrough. In order to activate the actuator A and the pilot assembly P under certain conditions described below, the plug 123 is disengaged from within the port 122 to permit a hydraulic or pneumatic hand pump (not shown) to be sealingly engaged within the port 122 during the start-up operation.

The upper housing 116 is secured by threads 124 to a lower cylindrical housing 125 therebelow, an O-ring 126 within its grooveway 127 defined within the upper housing 116 preventing fluid communication between the housings 116 and 125. As stated above, the port 120 defined in the lower housing 125 is operably associated with the threads 124 and the O-ring 126.

An inwardly protruding retainer ring 128 is housed interiorly within a bore 129 in the lower housing 125, the retainer ring 128 providing a guide during longitudinal movement of a spring housing 226 on the inner body 200, as well as being functional during assembly of the actuator A to hold in place the springs 227 and 228. A threaded portal 130, similar to the threaded portal 122 in the upper housing 116, is designed to receive a plug 131 secured therein. The plug 131 may be selectively removed to vent fluid within the piston low pressure chamber 132. Immediately below the port 130 is an inwardly protruding circumferentially extending retainer ring 133 partially housed within a boreway 134, the retainer ring 133 shouldering a spring retaining element 135 thereon. The spring retainer 135 has seats 136 and 137 thereon for receipt thereon of the lower end of the power and boost springs 227 and 228, respectively.

The lower housing 125 is secured at its lower end by threads 138 to a bonnet ring 139, an O-ring 140 housed within its grooveway 141 in the bonnet ring 139 preventing fluid communication between the ring 139 and the housing 125. The port 121 is operatively associated with the O-ring 140 and the threads 138 if it is desired to unthread the housing 125 from the bonnet ring 139 while the actuator A is in operation to vent pressure entrapped within the actuator A to be vented through the port 121 prior to complete unthreading of the members 125 and 139. An O-ring 142 is carried within a circular grooveway 143 in the bonnet ring 139 to prevent fluid communication between the ring 139 and the bonnet stem 201.

The bonnet ring 139 also contains a port 144 defined transversely therethrough to provide venting of pressure to atmosphere when it is desired to remove the bonnet ring 139 from the actuator base 155 therebelow. The ring 139 is secured by threads 145 to the base 155 which defines the lowermost end of the actuator housing 100. A plurality of O-rings 156 are contained within grooveways 157 to prevent fluid communication between the base 155 and a cylindrical packing cartridge 158 housed within a cylindrical bore 159 defined through the base 155 and the ring 139, the cylindrical packing cartridge 158, in turn, housing the O-rings 156 as well as a plurality of elastomeric T-seal elements 160 carried within their bores 161 in the cartridge 158. The T-seals 160, in combination with the O-ring 142, define the lowermost end of the low pressure piston chamber 132. A circular spacer element 162 is engaged on the outer housing 100 at the lowermost end of the bonnet ring 139 and between the base 155 to aid in proper affixation of the ring 139 to the base 155.

Referring to FIG. 12, the base 155 has defined through its upper end 163 a control pressure needle valve assembly 166 threadedly received within a bore 167 through the upper end 163. The needle valve assembly 166 is selectively manipulatable to insert or remove a needle element 168 at the lowermost end thereof with a sealing receiving end 169 of a seal seat 152 within a longitudinally defined passageway 170 defined through the base 155, the passageway 170 being, when the actuator A is affixed on a valve assembly of a flow line, in communication with the flow line. The seal seat 152 carries an O-ring 154 exterior thereof in a bore 154A defined around the seat 152 to prevent fluid transmission between the seat 152 and the base 155. The seat has at its lower end a portal 153 for transmission of fluid from the flow line and through the passageway 170. A check valve mechanism 146 is defined below the seal seat 152 to contain flow line flow within the base 155 when the needle valve assembly 166 is removed for repair purposes. A compressed spring 149 in the mechanism 146 urges a ball head 147 towards its seat 148 in the base 155, but sealing engagement of the ball 147 is prevented by the positioning of the lower end of the seal seat 152 until the seat 152 is removed with the needle valve assembly 166. A similar seal seat 184 with O-ring 185 within its grooveway 186 is carried in the base 155 below the bleed needle valve assembly 174, described below.

The needle valve assembly 166 is operable to isolate or communicate flow passageway portions 170 and 172 transverse of the needle valve assembly 166. A flow passageway portion 171 defines a threaded bore 171A normally receiving a plug 173 therethrough. When the needle 168 is reciprocated to disengaged position with respect to its seat 169, the passageway 170 and the passage portion 171 are permitted to communicate with the complimentary passage portion 172 also defined transverse of the needle valve assembly 166 and communicable to the portion of the bore 159 below the O-rings 156.

Figure 1B:
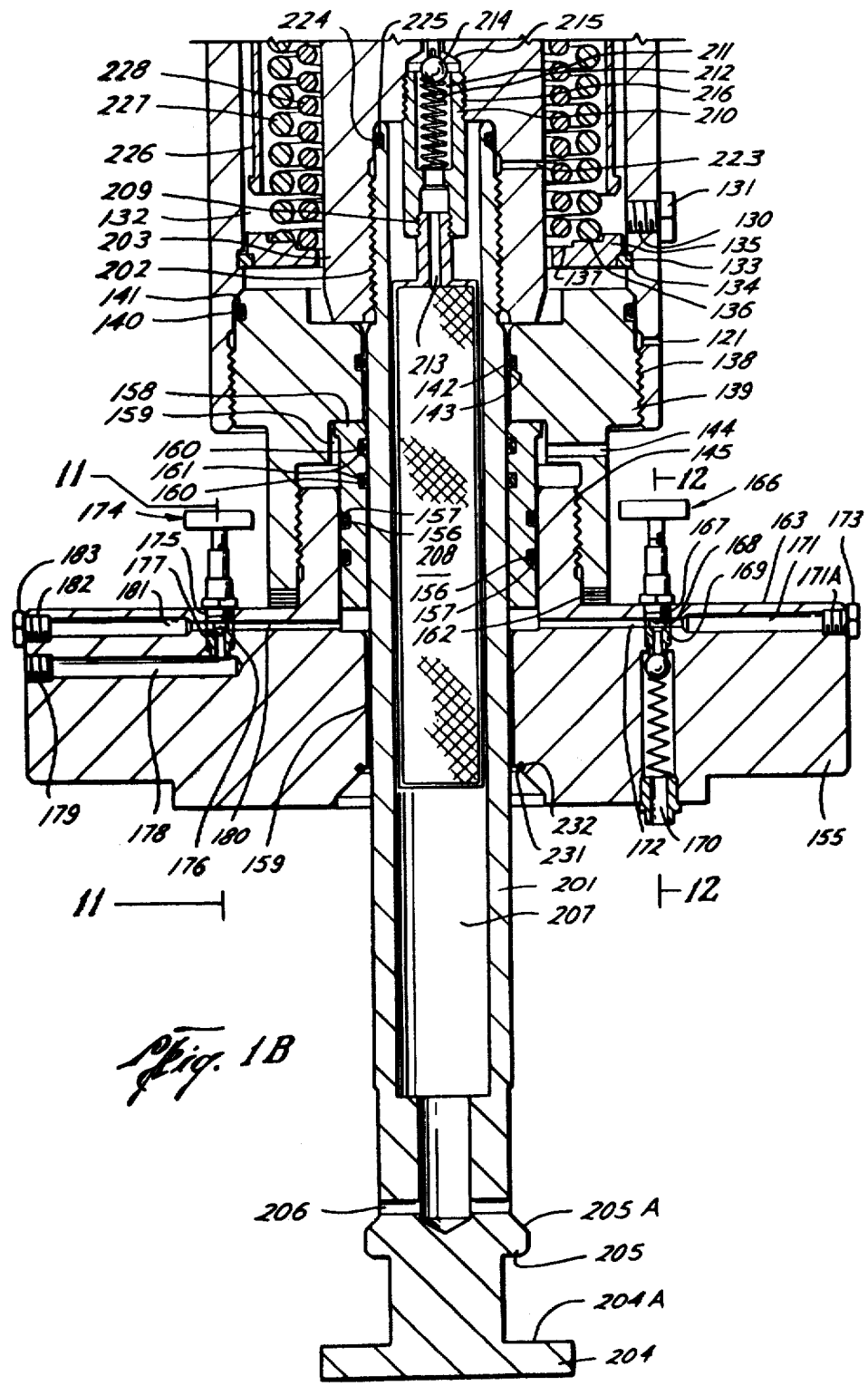
Figure 2A:
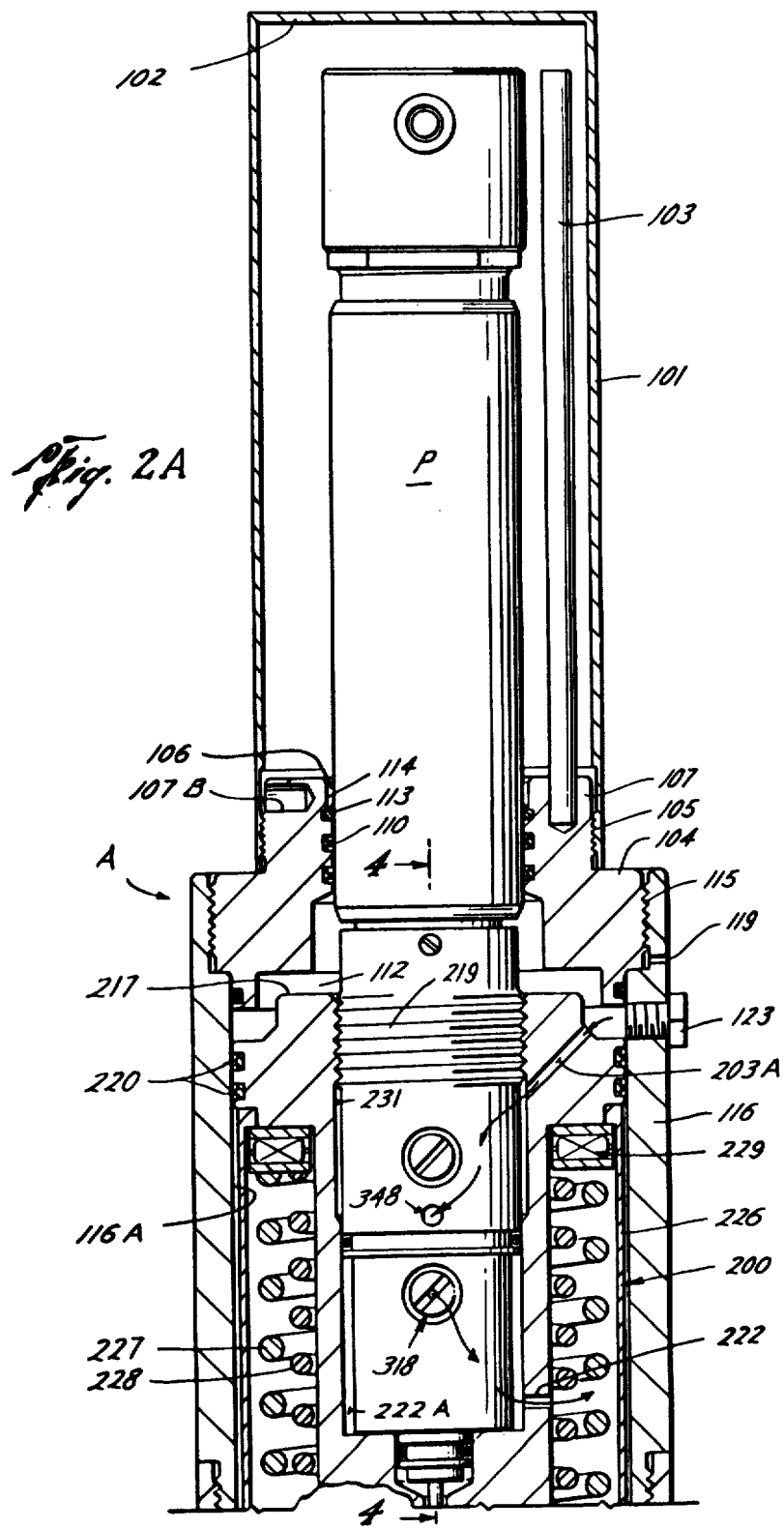

Referring to FIGS. 1B and 11, the base 155 also provides a bleed needle valve assembly 174 of similar design as the needle valve assembly 166, the assembly 174 being inserted through a bore 175 in the base 155 and having a needle 176 which is normally sealingly engaged on its seat 177 at the longitudinal end of an "L"-shaped flow passageway 178 defined through the base 155, the passageway 178 exteriorly terminating at a threaded portal member 179 which is normally open to atmosphere. The needle 176, when in sealingly engaged position, isolates transverse flow passage portion 178 from passage portions 180 and 181, the portion 180 communicating to the bore 159 and the portion 181 receiving through a threaded end 182 thereof a sealingly engaged plug 183.

The inner diameter of the lower portion of bore 159 below the O-rings 156 is somewhat less than the inner diameter of the bore 159 immediate the packing cartridge 158.

The actuator inner body 200 (FIGS. 1A and 1B), is comprised of a longitudinally extending bonnet stem 201 secured at one end by threads 202 to a cylindrical piston element 203.

The bonnet stem 201 has defined at its lowermost end an inverted T-shaped lift nut element 204 having an extended shoulder 204A thereon for engagement of a companion lift sleeve on the flow line valve assembly. The shoulder 204A engages the lift sleeve when the bonnet stem 201 is shifted upwardly to close the valve. Similarly, a downwardly facing protrusion 205 on the bonnet stem 201 provides means for transmitting downward force exerted through the bonnet stem 201 and through the lift sleeve to urge the flow line valve into open position by transmitting the force through the valve sleeve. The stem 201 also provides a beveled seat 205A for sealing engagement on an elastomeric O-ring 231 within a grooveway 232 in the base 155 when the stem 201 is shifted upwardly to close the flow line valve.

Above the shoulder 205A and defined through the bonnet stem 201 is a flow passage 206 for transmitting pressure and fluid from the flow line or well through the valve assembly therebelow and into an interior cylindrical bore 207. The bore 207 is longitudinal within the stem 201 and houses a circular exteriorly ported fluid filter 208 having small passageways defined therethrough to prevent transmission of particulate contaminant, such as paraffin, calcium scale, and the like, which may be carried within the fluid through the well or flow line, and preventing same from entering the interior of the filter 208.

The filter 208 is affixed at its upper end by threads 209 to a cylindrical union 210 which, in turn, interiorly defines at its upper end a cylindrical bore 211 for receipt of a compressed spring element 212, the bore 211 always being in communication with a passageway 213 therebelow and defined within the union 210 and the uppermost portion of the filter 208 for fluid communication with the bore 207 therebelow.

The upper end of the spring 212 receives a ball 214, the ball 214 being sealingly engagable upon its seat 215 defined on the piston 203. Normally, when the pilot assembly P is engaged within the piston 203, the ball 214 will be held off of its seat 215 and the spring 212 will be compressed slightly, such that fluid within bore 207 is permitted to pass through the filter 208, thence through the passageways 213 and 211, and through the valve seat 215 and the pilot assembly P.

The union 210 is affixed by threads 216 to the piston 203 which has an upper end 217 which faces the high pressure piston chamber 112 thereabove. The piston 203 also has a bore 218 defined longitudinally for receipt of the pilot assembly P, the pilot assembly P being affixed to the piston 203 at threads 219.

A plurality of elastomeric T-seals 220 are contained within grooveways 221 therefor on the piston 203 to prevent fluid communication between the piston 203 and the upper housing 116. Additionally, the T-seals 220 are permitted to slide along the inner wall 116A of the upper housing 116 as the piston 203 travels within the housing 100.

The piston 203 also has defined therethrough a plurality of bleed port members 222 and 223 communicating with the low pressure piston chamber 132 exteriorly thereof. The bleed port 222 is an integrable part of a flow passageway, described below in conjunction with the pilot assembly P, between the piston high pressure chamber 112 and the piston low pressure chamber 132. The port 223 is operably associated with the threads 202 engaging the bonnet stem 201 to the piston 203 and an O-ring 224 housed within a grooveway 225 therefor on the bonnet stem 201, the O-ring 224 preventing fluid communication between the bonnet stem 201 and the piston 203.

The piston 203 also houses within a longitudinally extending spring housing 226 a plurality of spring elements, one of the spring elements being defined as a power spring 227 having its lower end engaged upon the seat 136 on the spring retainer 135, the other of the springs being defined as the boost spring 228 having its lower end resting on the seat 137 of the retainer 135. The springs are compressed to urge the piston 203 in an upward position. The uppermost end of each of the springs 227 and 228 contact an upper spring retainer 229 circumferentially extending around the piston 203 and within the housing 226, the retainer 229 having therein a bearing 230 which is operational during the assembly of the actuator A inner body 200 to the housing 100 to permit engagement of the parts at the threads 202. The spring retainer is of split construction, having companion portions 229A and 229B.

A longitudinally extending passageway 231 is defined between the piston 203 and the pilot assembly P below the threads 219 and communicates with a passageway 203A in the piston 203 and, in turn, to the chamber 112. Another longitudinal passageway 222A communicates with the port 222.

Figure 3:
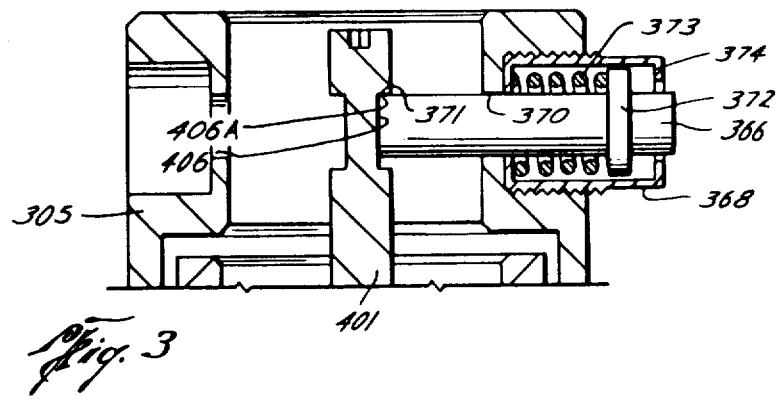
FIG. 3 is an enlarged sectional view taken along lines 3—3 of FIG. 1A illustrating the pilot stem and the detent pin assembly in engaged position.
Figure 6:
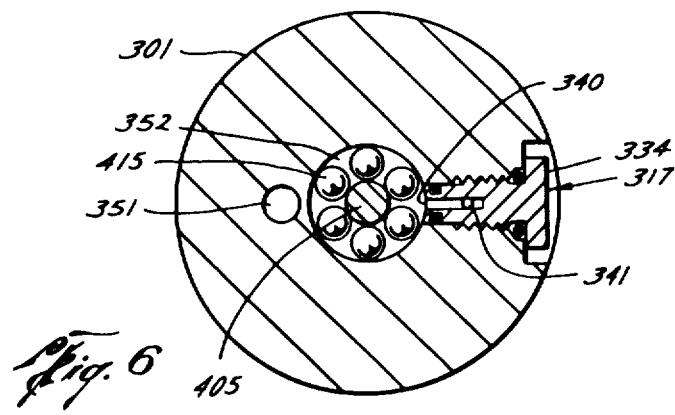
FIG. 6 is a cross-sectional view taken along lines 6—6 of FIG. 3B illustrating the balls operationally associatable with the low pilot freely traveling within their camway on the spool.
Figure 6A:
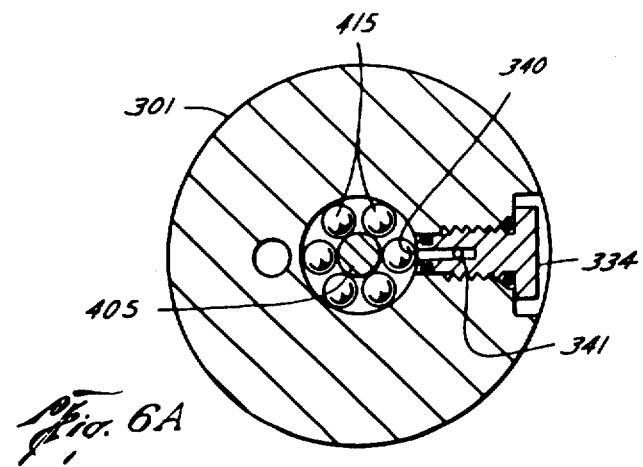
FIG. 6A is a cross-sectional view similar to that shown in FIG. 6 and taken along lines 6A—6A of FIG. 5 showing sealing engagement of one of the previously loose and free traveling balls onto its seat of the low pilot.
Figure 3A:
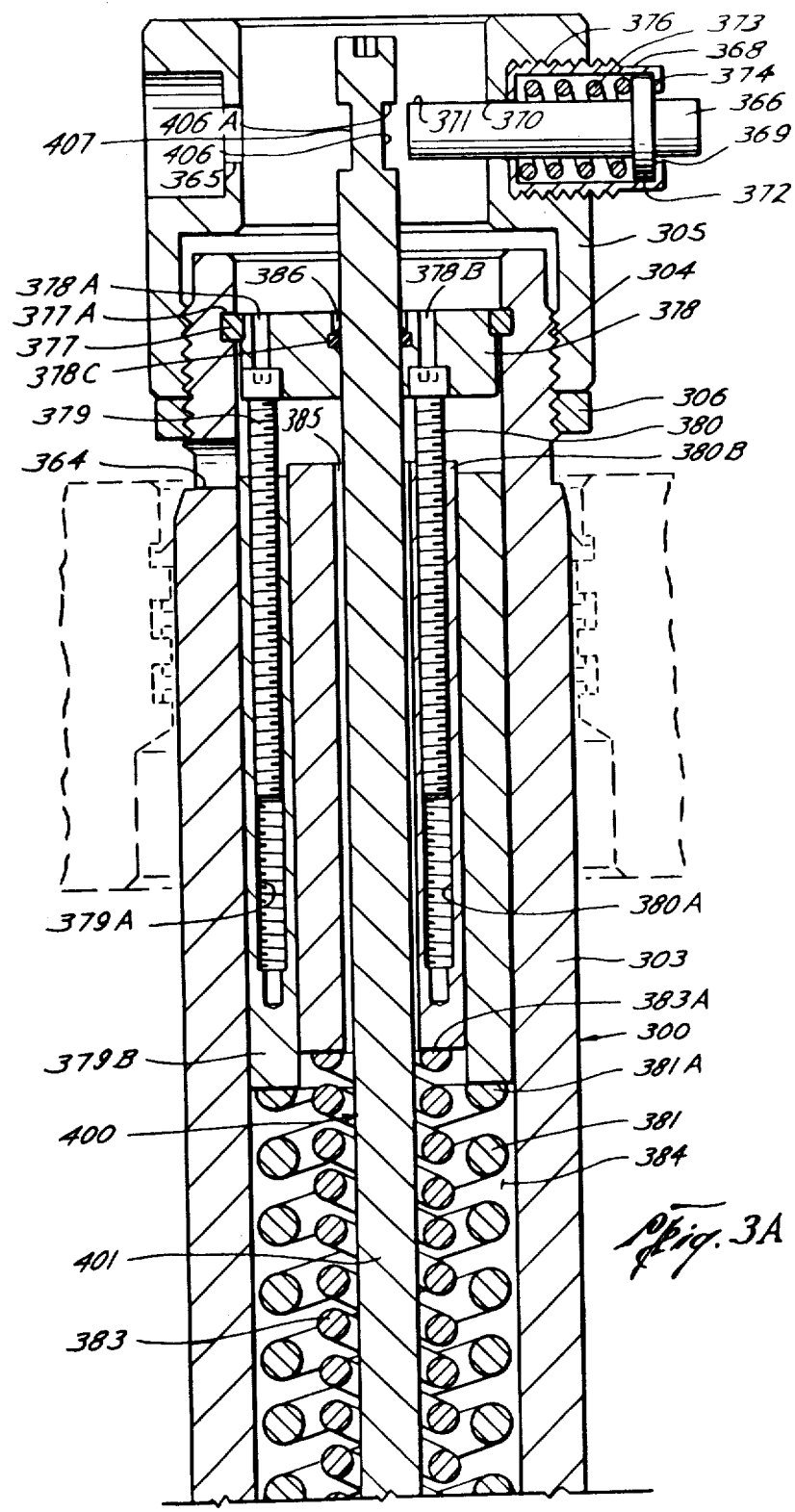

Referring now to FIGS. 3A and 3B, the pilot assembly P is secured to the piston 203 at threads 219, and is comprised of a housing 300 and an inner body 400. The housing 300 has a pilot body 301 at one end thereof, which is affixed by threads 302 to a longitudinally extending spring housing 303 which, in turn, is secured by threads 304 to a detent housing 305, which defines the upper end of the pilot assembly housing 300. A lock nut 306 is secured on the threads 304 for additional affixation of the detent housing 305 to the spring housing 303.

An O-ring 307 is housed within a grooveway 308 defined within the pilot body 301 to prevent fluid communication between the pilot body 301 and the piston 203. The pilot body 301 has a threaded bore 309 at one end thereof for receipt of a pilot check assembly 310 having a longitudinal flow passageway 311 defined therethrough. When the pilot P is inserted within the piston 203, a ported end 312 of the pilot check 310 will contact the outer periphery of the ball 214 to cause the ball 214 to be shifted away from its valve seat 215 and contract the spring 212. Upon removal of the ball 214 from its seat 215, a flow passageway is defined above the ball 214 for transmission within the pilot check 310 through a transverse flow passageway 313 defined immediate the end 312 thereof. An O-ring 314 is defined within its grooveway 315 in the pilot body 301 immediate the pilot check 310 to prevent fluid communication between the pilot body 301 and the piston 203.

The pilot body 301 contains three pilot members 316, 317 and 318 which are operationally associatable with a pilot spool 405 and flow passageways which are manipulatable by positioning of the spool 405. The members are identified as the high pilot 316, the low pilot 317, and the bleed pilot 318, each having an internal seat which is functional with the longitudinally manipulatable spool 405. The high pilot 316 is affixed within the pilot body 301 by means of threads 320 and has an outer sealed end 321 within an engrooved bore along the exterior of the body 301. The high pilot 316 also provides a flow passage 323 defined therethrough. The internal end 324 of the pilot 316 is open therethrough for selective communication between the flow passageway 323 and a passageway 325 extending longitudinally within the body 302 to the passageway 311 in the pilot check 310. The open end 324 also serves as a seal seat for one of a plurality of neutrally buoyant spherical balls 419 which may be selectively wiped onto and off of the seat 324 as described hereafter. A ported washer 331 and a companion ported lock ring 332 are defined within the passageway 325 and within the pilot body 301 to permit fluid transmission therethrough, but to prevent relative longitudinal free travel of the balls 419 therebeyond. A plurality of O-rings 327 and 329 are inserted within circumferentially extending exterior bores 328 and 330, respectively, in the pilot 316 to prevent fluid communication between the pilot 316 and the body 301.

The low pilot 317 is secured within the pilot body 301 by means of threads 333, the pilot 317 having an outwardly protruding solid end 334 defined within a receptacle 335 therefor within the body 301. A plurality of longitudinally extending O-rings 336 and 337 are housed within their respective grooveways 338 and 339 in the pilot 317 to prevent fluid communication between the pilot 317 and the body 301. The pilot 317 has an internal seal seat 340 thereon for selective engagement of one of a plurality of balls 415 which is selectively wipable onto and off of the seat 340, the seat 340 defining the internal end of a passageway 341 defined within the pilot 317.

The bleed pilot 318 is securely affixed within the body 301 by threads 342 and has an outwardly protruding end 343 shouldering on a bore 344 in the body 301, the end 343 having an open end 345 therethrough for fluid communication with a flow passageway 346 within the bleed port seat 347. The pilot 318 has an internally facing seal seat 347 which receives one of a plurality of balls 417 which is selectively wipable onto and off of the seat 347.

Between the pilots 317 and 318 is a power port 348 having internal threads 349 thereon for selective receipt of a pressure monitoring device (not shown) in the event that it is desired to manually apply pressure within the pilot P for testing purposes. The port 348 normally is in flow communication with the passageway 341 defined within the low pilot 317 and is also in communication with a flow passageway 231 extending between the pilot assembly P and the piston 203 and above the O-ring 307. The passageway 231 continues internally through the piston 203 by means of piston passage 203A terminating upwardly of the piston 203 and communicating with the piston pressure chamber 112. The passageway 341 in the pilot 317 is sealingly terminated at its longitudinal end opposite the port 348 by means of a plug apparatus 350. The port 348 also communicates with a longitudinal flow passage 348A defined between the members 301 and 405 and between the piston areas P-2 and P-3.

The pilot body 301 also contains downstream of the high pilot 316 a longitudinally extending fluid passageway 351 which always is in fluid communication with the passageway 323 within the pilot 316. The passageway 351 also is in communication with a central control flow area 352 which will be described in further detail in conjunction with the operation of the spool 405 of the pilot inner body 400.

The pilot body 301 also contains a plurality of spool seal bores 353A, 353B and 353C for travel therealong of O-ring elements on the spool 405 which, in turn, define pressure areas thereacross.

The spring housing 303 provides at one end thereof a circular pilot spacer 355 having an abutment 356 thereon shouldering with the lower end of the spring housing 303. A circumferentially extending O-ring 358 within its grooveway 359 is defined at one end of the pilot spacer 355 to prevent fluid communication between the spacer 355 and the pilot body 301. Additionally, the spacer 355 has a cylindrical elongate 360 having therein an O-ring 361 within its grooveway 362 to prevent fluid communication between the spacer 355 and the spring housing 303. A bore 363 is defined in the center and through the spacer 355 for insertion therein of the spool 405. The bore 363 also sealingly engages an O-ring 409 within its grooveway 408 on the spool 405 which defines a piston area P-1 thereacross preferably having the same diameter as that defined at piston area P-3 by the O-ring 412 in its grooveway 413 at the spool seal bore 353C. It should be noted that while the seals 353A and 353C have an equal internal diameter, the internal diameter at the seal 353B is larger, for purposes as will be described below. The spacer 355 also has upper face 355A which is the down stop for longitudinal travel of the pilot inner body 400.

A set screw 367 is inserted through its bore 367A on the pilot body 301 to assist in securement of the spring housing 303 to the body 301, the screw 367 being functionally associatable with the threads 302.

A transverse bore 364 is defined through the spring housing 303 at the upper end thereof to permit insertion therethrough of the reset rod 103 to permit disassembly of the housing 303 from the pilot body 301 therebelow for repair or replacement purposes. The detent housing 305 also contains a similar transverse bore 365 defined therethrough which may also be used to cock the piston stem 401 in relation to a detent pin 366 during the start-up operation.

On the opposite side of the bore 365 and inserted within the housing 305 within a threaded bore 376 is a detent pin housing 378 providing latitudinally extending detent pin member 366 insertable within the housing 378 by means of the opening 369, the pin permitted to penetrate through the housing 305 by means of the bore 370 therefor, the end 371 of the pin 366 being selectively engageable within a slot 406 on the upper end of the pilot stem 401. The pin 366 has on the end opposite of end 371 an external carrier band 372 which, because of the urging of a circularly extending spring element 373 secured exterior and around the pin 366 causes the band 372 to contact a shoulder 374 on the housing 368 when the detent pin 366 is not engaged with the pilot stem 401.

Internally of the spring housing 303 and carried therein by means of a lock ring 377 within a groove 377A therefor is a caplike spring retainer 378 having first and second adjustment ports 378A and 378B longitudinally extending therethrough and receiving at one end thereof high and low pilot adjustment bolts 379 and 380, respectively, the bolts 379 and 380 being carried within their respective threaded bores 379A and 380A in elongated spring adjustment members 379B and 380B, respectively.

Within the spring housing 303 and shouldered at the lower end of the adjustment member 379B is a compressible high pilot spring 381 having its upper end 381A shouldered on the lower end of the adjustment member 379B and having its lower end 381B resting upon a circumferentially extending high pilot spring washer 382 which, in turn, rests upon the elongate 360 of the pilot spacer 355.

Also within the spring housing 303 and internally of the high pilot spring 381 is the low-high pilot spring 383 having its upper end 383A shouldered on the lower end of the low pilot adjustment member 380B, and its lower end 383B resting upon a thread coupling 403 immediate the lower end of the pilot stem 401.

The cylindrical internal diameter of the spring housing 303 defines an atmospheric chamber 384. Additionally, it should be noted that the spring adjustment member 380B has a longitudinally extending boreway 385 for receipt of the pilot stem 401. A companion bore 386 is defined within the center of the spring retainer 378.

The pilot assembly inner body 400 consists of a longitudinally extending pilot stem 401 which is affixed by threads 402 at one end thereof to a thread coupling 403. The pilot stem 401 is associated by means of the coupling 403 to a spool element 405 housed interiorly of the pilot body 301. The pilot stem 401, which is insertable through the contaminant wiper seal 378C and the bores 385 and 386 within the pilot housing 300, has at its upper end a detent lock groove 406 with a shoulder 406A for receipt of the interior end 371 of the detent pin 366 when it is desired to lock the stem 401 and spool 405 in the "neutral" or normal operating position. To the opposite side of the lock groove 406 is a similar groove 407 for receipt of the end of the reset rod 103 which is inserted through the bore 365 when it is desired to cock the pilot stem 401 manually to the "neutral" position during initial start-up or testing of the actuator A or the flow line.

The spool 405 has a grooveway 408 thereon for receipt therein of an O-ring seal 409, the ring 409 defining thereacross a piston area P-1. A similar O-ring 410 within its grooveway 411 also is carried on the spool 405 and defines thereacross a second and somewhat larger piston area P-2 at the ring 410. A third and lower O-ring 412 within its grooveway 413 defines yet another piston area P-3 at the ring 412. The spool 405 contains a first circular ball camway 414 which houses a plurality of neutrally buoyant ball spheres 415, one of which is selectively wipable onto or off of its companion seat 340 on the low pilot 317. A similar ball camway 416 houses a plurality of balls 417 for selective engagement upon their companion seat 347 on the bleed port 318. The ball camways 414 and 416 each have upper and lower camway shoulders 414A, 414B, 416A, and 416B, respectively, to cause the ball elements 415 and 417 to become engaged onto or wipable off of their companion seats as the spool 405 is shifted longitudinally within the pilot assembly housing 300. Additionally, the shoulder 414A defines the up stop to upper travel of the pilot inner body 400.

The spool 405 lower end 418 generally serves the same function as the upper and lower shoulders of the ball camways described above by permitting or preventing sealing engagement of a spherical ball element 419 onto its companion seat 324 on the high pilot 316 as the spool 405 is longitudinally manipulated within the housing 300. It is important to note that in the neutral position the location and configuration of the end 418 and the camway shoulders 414A, 414B, 416A, and 416B are such that when the end 418 is immediate the seat 324 of the high pilot 316, thus preventing sealing engagement of any of the balls 419 on the seat 324, the shoulders 416A and 416B permit one of the balls 417 to seek and sealingly engage the seat 347 on the bleed port 318, as well as enable the shoulders 414A and 414B to prevent any of the balls 415 from sealingly engaging upon the seat 340 on the low pilot 317.

Figure 4:
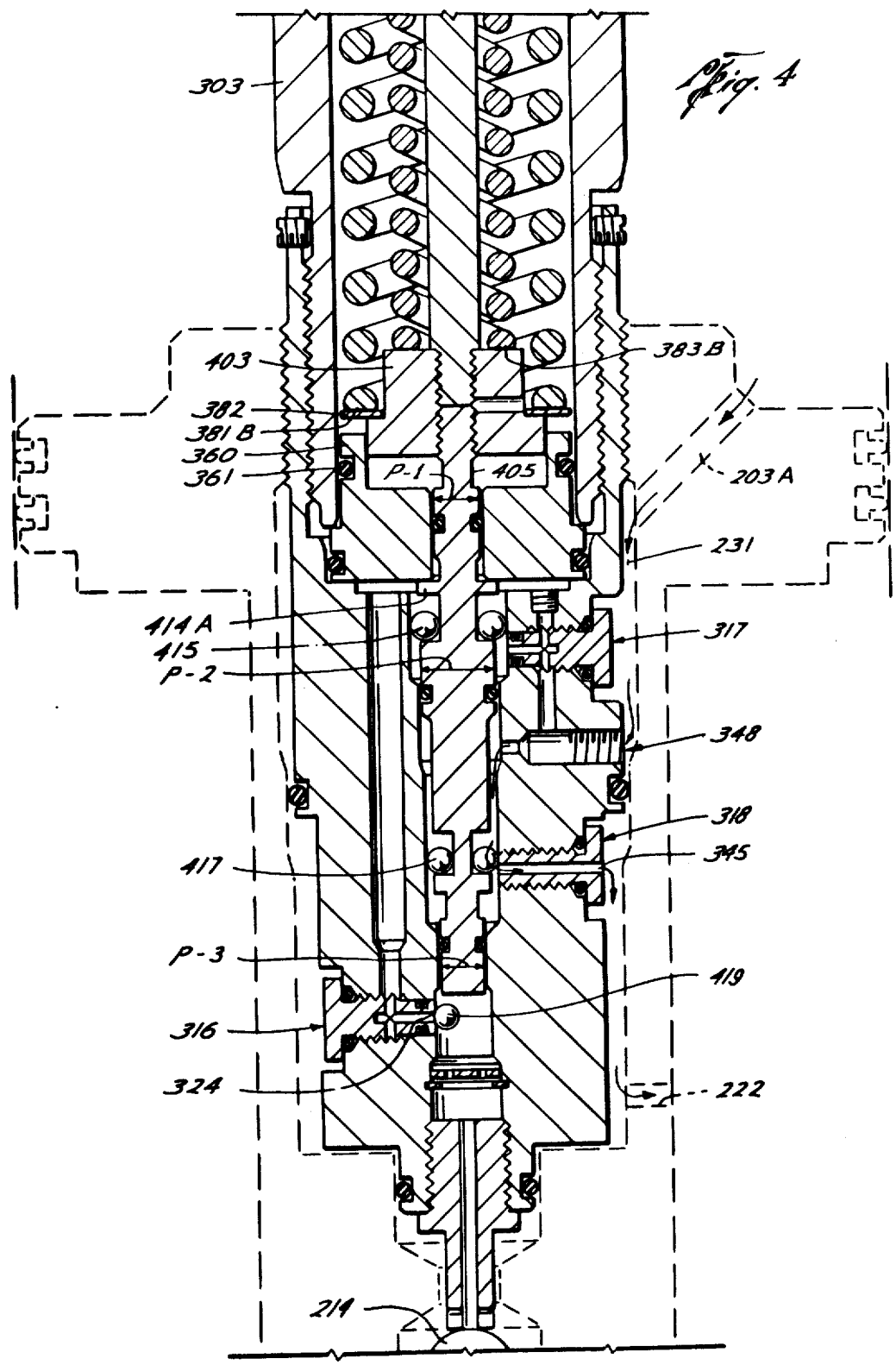
FIG. 4 is a longitudinal sectional view similar to that shown in FIG. 3B, the pilot stem and spool being shown shifted from the neutral position of FIG. 3B to the up or venting position caused by a high pressure condition to vent pressure from above the actuator piston to a pressure chamber therebelow to permit the actuator to shift the gate of the valve ultimately to the position shown in FIG. 2.
Figure 5:
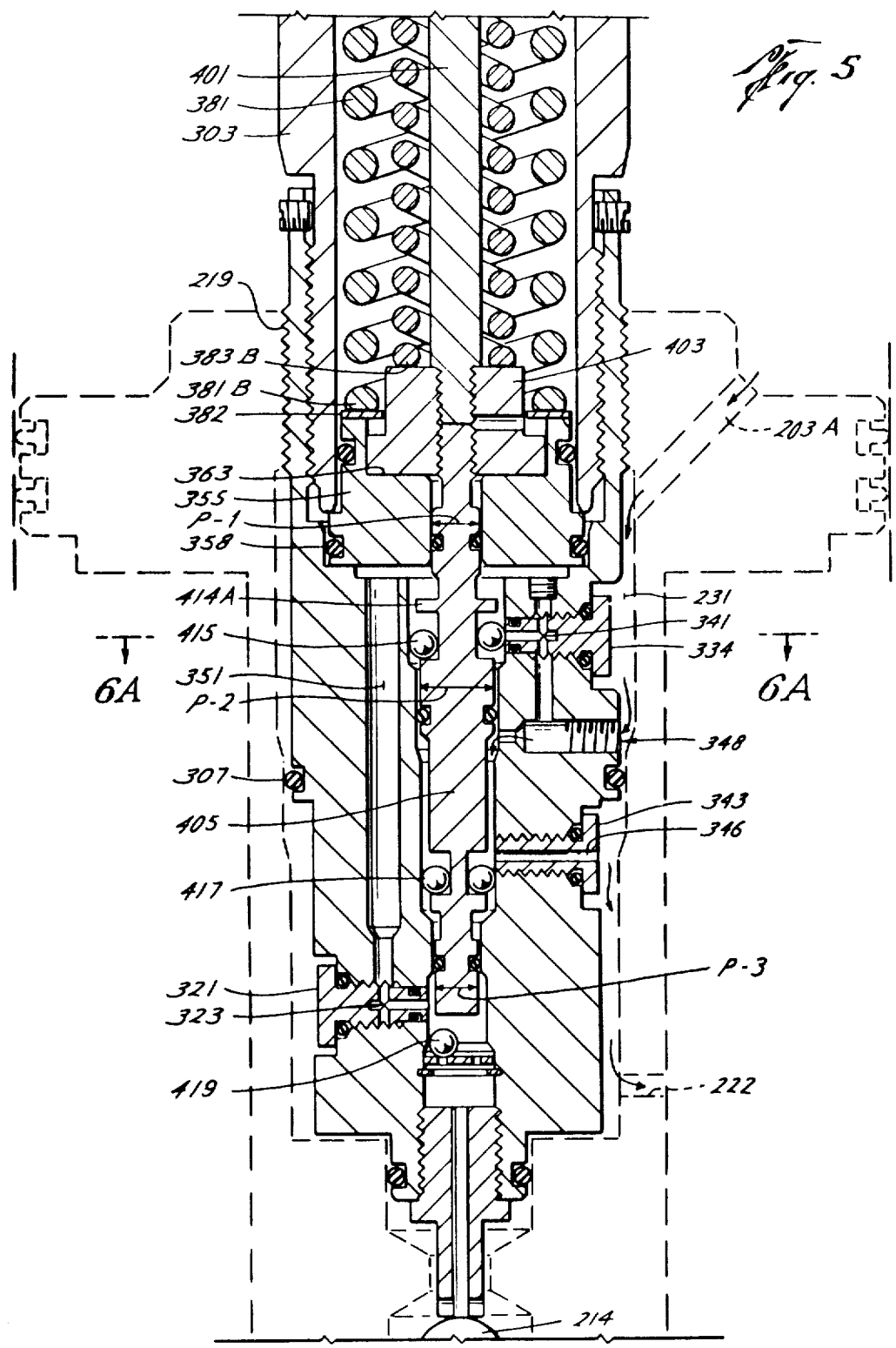
FIG. 5 is a longitudinal sectional view similar to that shown in FIGS. 3B and 4, the pilot stem and spool being positioned in the down or venting position caused by a low pressure condition to transfer fluid from above the piston to below the piston to cause the actuator to ultimately shift the gate of the valve assembly to the position as shown in FIG. 2.

Thus, it can be seen that the spool 405 is manipulatable to three longitudinal positions, i.e., up (FIG. 4), neutral (FIG. 3B), and down (FIG.5). There are also four transitional positionings of the spool 405 in the shifting of the spool 405 to the three positions above. When the spool 405 is shifted from the neutral position to the up position when pressure within the flow line rises above the normal operating range, thus creating a high pilot condition, there is sufficient longitudinal travel of the spool 405 for the high or supply pilot 316 ball 419 to move near the seat 324 on the supply pilot assembly 316, but the ball 419 will not be caused to be sealingly engaged upon the seat 324 because of a lack of fluid flow in the passageways 351 and 325. The spool 405 continues its upward movement and the lower shoulder 416A contacts the balls 417 and causes the sealed ball 417 on the seat 347 of the bleed pilot assembly 318 to be frictonlessly wiped off of the seat 347. As a result of the removal of the sealed ball 417 from its seat, fluid flow is initiated within the pilot assembly P and the actuator A, as illustrated by the passageways in FIG. 4 by arrows. Thus, when shifting the spool 405 from the neutral position to the up position, the spool 405 is designed such that the balls 419 and 417 may be engaged upon their respective seats simultaneously if there is flow. When the spool 405 is shifted from the up position to the neutral position, as shown in FIG. 3B, and when pressure within the flow line returns to within the normal operating range, the spool 405 moves downwardly and the shoulder 416A moves below the seal 347 before the end 418 of the spool 405 contacts the sealed ball 419 on the supply pilot assembly 316. However, the ball 417 does not engaged the seal seat 347 because of lack of flow of fluid within the pilot assembly P until further downward travel of the spool 405 causes the ball 419 to become completely wiped off of its seal seat 324 and, at such time, fluid flow is initiated to permit one of the balls 417 to seek and seal upon its seat 347 upon the bleed pilot assembly 318, the flow passageway being illustrated in FIG. 3B. It should be noted that in each of the above transitional movements of the spool 405 the balls 415 always are caused to be disengaged from the seat 340 on the low pilot assembly 317.

When the spool 405 is shifted from the neutral position to the down position, shown in FIG. 5, as a result of pressure within the flow line falling below the normal operating range, the spool 405 is shifted downwardly such that the free floating balls 415 are permitted by the lower movement of the lower shoulder 414B to come into the vicinity of the seat 340 on the low pilot assembly 317, but, because of lack of fluid flow within the pilot assembly P, the balls 415 do not engage upon the seat 340. As the spool 405 continues lower travel, the upper shoulder 416B contacts the sealed ball 417 on the seal 347 of the bleed pilot assembly 318 and frictionlessly wipes it off of the seat 347. Concurrently with the removal of the ball 417 from the seal seat 342, flow within the pilot assembly P immediately is initiated, as illustrated by the arrows in FIG. 5, and the flow thus causes one of the free floating balls 415 to seek and seal upon the seat 340 of the low pilot assembly 317.

When the spool 405 is shifted from the down position to the neutral position, shown in FIG. 3B, when pressure within the flow line is within normal operating range, the spool 405 is shifted upwardly and the free balls 417 approach, but do not seal upon, the seal seat 347 of the bleed pilot assembly 318. The spool continues upward movement permitting the lower shoulder 414B to contact the sealed ball 415 to frictionlessly wipe it off of the seat 340 of the low pilot assembly 317. Concurrently with the removal of the sealed ball 415, flow within the pilot assembly P is initiated and one of the free floating balls 416 seeks and engages upon its seal seat 347 on the bleed pilot assembly 318, the flow of fluid being as illustrated by the arrows in FIG. 3B.

When the spool 405 is shifted from the neutral position to the down position and from the down position back to the neutral position, it should be noted that the ball 419 of the high pilot assembly 316 always is away from its seat 324.

OPERATION

Initial Activation Mode

The actuator A is first affixed to a valve mechanism, such as the gate valve assembly shown in FIGS. 1 and 2, with the base 155 being sealingly secured to the gate valve body. The valve operator is secured to the bonnet stem 201 at the lift nut 204 and between the protrusion 205 and the shoulder 204A. To assure zero pressure within the actuator prior to initial activation, the needle valve assembly 166 is manipulated to closed position. The bleed needle valve assembly 174 is hand manipulated to open position to communicate flow passage portion 180 with flow passage portion 178 and any fluids drained from within the low pressure chamber 132.

The stem protector 101 is disengaged from the actuator outer housing 100 at the threads 105 to obtain access to the reset rod 103. The reset rod 103 is removed from the bore 108 and inserted through the bore 365 in the detent housing 305 and into the groove 407 on the pilot stem 401 to pry the stem 401 longitudinally upwardly against the downward force exerted on the stem 401 by the spring 383. Concurrently, the end 371 of the detent pin 366 is manually forced into its companion groove 406 on the pilot stem 401 by the operator's finger applying inwardly exerted pressure on the pin 366 to overcome the force exerted through the compressed spring 373 within the housing 368. When the end 371 "snaps" into its grooveway 406, and reset rod 103 may be removed from the grooveway or bore 407 and the bore 365 in the detent housing 305, and the operator's hand may be removed from the pin 366. The downward force exerted through the spring 383 will cause the pilot stem 401 to remain in stable position because of the positioning of the detent pin 366 end 371 in its grooveway or bore 406, the downward force of the spring 383 being exerted through the pilot stem 401 to the detent pin 366 by means of the shoulder 406A at the upper end of the groove 406. This position is shown in FIG. 3. In this position, the pilot stem 401 and the spool 405 have been shifted longitudinally upwardly such that the end 418 of the spool 405 is still immediate the seat 324 of the high pilot 316 to prevent any of the balls 419 from sealingly being engaged on the seat 324, but one of the balls 417 now is positioned to be sealingly engaged upon the seat 347 on the bleed pilot 318 when flow is initiated, the lower movement of the spool 405 moving the shoulder 416B sufficiently away from the seat 347. In addition, the spool 405 now is positioned such that the balls 415 are prevented from sealingly engaging upon the seat 340 on the low pilot seat 317 by the positioning of the shoulder 414B relative to the seat 340. This position is as shown in FIG. 3B.

Thereafter, the bleed needle valve assembly 174 is closed and the supply needle valve assembly 166 is hand manipulated to the position shown in FIG. 2B such that the needle 168 is sealingly disengaged from its seat 169 and from within the passageway 170 to permit fluid and pressure to be transmitted within the flow line to pass therethrough and within the passageway portion 172. When flow is initiated through the line, pressure will be contained within and between the ring 231 in the base 155 and the plural T-seals 160 and the O-rings 156 within the packing cartridge 158.

Assuming: that the flow line normal operating pressure is 1,000 p.s.i.; that the low pilot has been calibrated to close the gate of the gate valve assembly when pressure within the flow line falls below 250 p.s.i.; and that the high pilot has been calibrated to close the gate of the gate valve when pressure within the flow line exceeds 1,500 p.s.i., the detent pin 366 will remain in engaged position until pressure within the flow line exceeds 250 p.s.i. If there is insufficient pressure in the flow line to stroke the piston 203, a hand pump is used to apply supply pressure within the actuator A, as described below. If there is pressure within the flow line, it may be sufficient to stroke the piston 203 but insufficient to shift the spool 405 to the neutral position. Increased pressure within the flow line will cause the spool 405 and stem 401 to be shifted upwardly to disengage the detent pin 366. When the pressure within the flow line exceeds the low pilot calibration, i.e., the downward force exerted on the pilot stem 401 and the spool 405 by the spring 383, the detent pin 366 snaps out of position and pressure and fluid will pass through the passage 206 in the bonnet stem 204, within the bore 207, through the filter 208, thence through the passageway 213 above the filter 208, through the flow passageway 211 within the union 210, and will pass above the ball 214 and into the end 312 of the pilot check 310, thence through the passageways 311 and 325, as shown in FIG. 3B. Because the balls 419 are held off of the seat 324 by the end 418 of the spool 405 being positioned immediate the seat 324, pressure and flow will continue within the passageway 323 in the high pilot 316, then longitudinally within the pilot body 301 through the longitudinal passageway 351, thence within the flow area 352, through the seat 340 and into the passageway 341 of the low pilot 317, thence through the port 348, and into the passage 231 between the pilot assembly P and the piston 203 and through the flow passage 203A in the piston 203, and will ultimately be contained within the high pressure piston chamber 112.

As pressure is increased within the actuator A and the pilot assembly P, the pilot stem 401 is shifted upwardly such that the shoulder 406A becomes disengaged from the end 371 of the detent pin 366, thus permitting the force exerted through the spring 373 onto the carrier band 372 to cause the pin 366 to shift laterally outwardly from the bore or grooveway 406 of the stem 401, so that the stem 401 no longer is in an upwardly locked position and is positioned as shown in FIG. 3A.

As fluid and pressure are increased within the chamber 112, pressure therein becomes higher than that contained in the low pressure piston chamber 132 therebelow. The increased pressure differential overcomes the force of the power and boost springs 227 and 228, respectively, which urge the piston 203 to an upward position. As pressure is thus increased within the chamber 112, the piston head 203 is caused to shift longitudinally downwardly carrying with it the bonnet stem 201 and the gate valve controller which is affixed to the stem 201. Accordingly, as the piston 203 and the bonnet stem 201 are shifted downwardly, the gate of the gate valve becomes sealingly disengaged from its seat to permit fluid flow through the gate and downstream of the gate and within the flow line.

It should be noted that when pressure is increased within the flow line as described above, there will be a pressure variance between (1) the passageways immediate the spool 405 and (2) within the chamber 384 immediate the springs 381 and 383, since the chamber 384 is at substantially atmospheric pressure. Accordingly, a differential pressure will be exerted across the piston area P-1. Thus, the spool 405 and the pilot stem 401 are urged in an upward direction. It can thus be seen that the pilot assembly P of the actuator A allows pressure within the flow line to act on one of the piston areas, i.e., P-1, to hold the pilot assembly P in the neutral position and the gate valve in the open position.

INCREASE IN FLOW LINE PRESSURE ABOVE NORMAL OPERATING RANGE

Assuming that the high pilot spring 381 has been precalibrated to "trip" the pilot assembly P when pressure in the flow line upstream or downstream of the gate valve assembly exceeds normal operating pressure, i.e., 1,500 p.s.i., pressure within the bore 207 of the bonnet stem 201, within the passageways surrounding the spool 415, and within the pilot body 301 will increase. As the pressure within the pilot body 301 increases, the force acting across the piston area P-1 on the spool 405 increases, thus urging the spool 405 and its interconnected pilot stem 401 in an upward position. However, this upward urging of the stem 401 and spool 405 is resisted by the downward force acting through the stem 401 by means of the springs 381 and 383 acting in concert. That is, the sum total of the downward force exerted through the springs 381 and 383 is the setting for the high pilot condition. As the spool 405 and the stem 401 gradually shift longitudinally upwardly, overcoming the force exerted by the springs 381 and 383, the end 418 of the spool 405 passes from immediate the seat 324 of the high pilot 316. However, the balls 419 are not urged onto the seat 324 of the high pilot 316 because there is a lack of fluid flow within the flow passageways in the pilot body 301 surrounding the spool 405 because one of the balls 417 is engaged upon its seat 347 on the bleed port 318. As pressure is increased within the pilot body 301, the spool 405 continues to overcome the downward resistance afforded by the springs 381 and 383, the shoulder 416A of the camway 416 engages the balls 417, and the sealed ball 417 is wiped off of its companion seal 347 on the bleed port 318. Concurrently with the removal of the sealed ball 417 from sealing engagement position on the seat 347, pressure and fluid trapped within the high pressure piston chamber 112 above the piston 203 will immediately begin to surge through the flow passages 203A and 231, through the power port 348, then through the passageway 348A between the power port 348 and the camway 416 for the balls 417, into the passageway 346 within the bleed port seat 318, out of the open end 345 thereof, into the bleed passage 222A, and into the bleed port 222 and subsequently into the low pressure piston chamber 132. At the same time that the sealed ball 417 is wiped from its seat 347, the flow surge causes the balls 419 to follow the flow travel within the pilot body 301 and thus enable one of the balls 419 to seek and become sealingly engaged upon the seat 324 on the high pilot 316 to shut off supply flow and pressure within the flow line and the bore 207 of the bonnet stem 201. Upward movement of the pilot inner body 300 continues until the shoulder 414A interfaces with the lower end of the pilot spacer 355, as shown in FIG. 4.

Because the balls 417 are sealingly disengaged from the seat 347, thus permitting the opening of the bleed port 318, pressure within the high pressure piston chamber 112 will be transferred to the low pressure piston chamber 132, and the boost and power springs 228 and 227, respectively, together with the flow line pressure exerted across T-seals 160, will urge the piston head 203 and the pilot assembly P in an upward position, causing the bonnet stem 201 to move upwardly and the gate to become sealingly engaged upon its seat in the gate valve assembly, isolating flow upstream and downstream of the gate valve.

It should be noted that, as a result of the upward movement of the bonnet stem 201 and the closing of the gate valve, pressure within the pilot assembly P is equalized by transmission through the port 222, which is exposed to the low pressure chamber 132. Accordingly, the loss, if any, of differential pressure which was originally exerted at P-1, now is exerted at the lowermost O-ring 412 at its seat 353C on the pilot body 301 defining P-3. Thus, there is no net force or pressure change across the spool 405 itself. This pressure differential at P-3, if any, keeps the sealed ball 419 in sealing engagement with the seat 324.

It should also be noted that the effective piston areas across P-1 and P-3 are equal such that the forces transmitted thereacross do not change. Accordingly, the spool 405 is urged in a downward direction because of the force exerted on the stem 401 and its interconnected spool 405 by the springs 381 and 383 which still act in opposition to the differential pressure acting across piston area P-3.

DECREASE OF PRESSURE TO WITHIN NORMAL OPERATING RANGE

If and when the pressure within the flow line immediate the gate valve and within the bore 207 of the bonnet stem 201 is reduced to within normal operating range as pre-set on the springs 381 and 383, and, assuming that beforehand the supply needle valve assembly 166 is manipulated to open position such that the passageway 170 is in fluid communication with the passageway portion 172, and the seal 231 is engaged on its companion shoulder 205A on the bonnet stem 201, the pressure differential across the piston area P-3 will be decreased because pressure within the chamber area 325 of the pilot body 301 is now decreased and within the normal operating range of the flow line. Accordingly, the downwardly exerted forces through the springs 381 and 383 acting on the stem 401 and the spool 405 will overcome the upward urging defined by the pressure differentials across P-3 and P-1 to shift the spool 405 longitudinally downwardly until the lower end of the coupling 403 shoulders on the upper face 355A of the pilot spacer 355. The downward travel of the spool 405 first will permit the shoulder 416A to move away from the seal 347 to allow a free ball 417 to be in position to thereafter become sealingly engaged upon the seat 347 on the bleed port 318 to isolate the passageway 346 within the bleed port 318 from the longitudinal passageway 348A communicating with the port 348. Thereafter, the sealed ball 419 is wiped off of its seat 324 on the high pilot 316 initiating an immediate flow surge and a free ball 417 now becomes sealingly engaged on the seat 347. Pressure and flow will be transmitted through the pilot body 301 immediate the spool 405 and to the high pressure piston chamber 112, as shown in FIG. 3B, to urge the piston head 203 downwardly to overcome the upward force exerted by the expanded power and boost springs 227 and 228, thereby shifting the piston 203, the pilot assembly P and the bonnet stem 201 in a downward position to again reopen the gate of the gate valve assembly and permit communication of fluid upstream and downstream of the gate valve.

The reopening of the gate valve as described above permits the increase of pressure through the bore 207 acting upon the spool 405 to trasfer the pressure differential previously acting across the piston area P-3 now to act across the piston area P-1.

It should be noted that if the supply needle valve assembly 166 is manipulated to closed position such that the needle 168 is sealingly engaged within the end 169 to isolate the passageway 170 from the passage portion 172, the actuator A will not reopen because fluid cannot be transmitted within the stem 201 above the seal 231 which is sealingly engaged upon its seat 205A to permit displacement of the piston 203. Thus, if the supply needle assembly 166 is in "closed" position, the actuator A will not automatically reset after reduction of pressure above the high pilot setting to within normal operating range. If, however, the supply needle valve assembly 166 is in "open" position and chamber 132 contains no fluid, the actuator A will automatically reset when normal operating conditions are again encountered. It can be seen that one of the primary functions of the utilization of the seal 231 and its companion seat 205A on the bonnet stem 201 in combination with the supply needle assembly 166 is to permit selective automatic resetting after encountering an abnormally high pressure condition.

It is important to note that the detent initiation mechanism will not override a high pilot condition and that the actuator A may be manually reset, but will require continuous pressure being applied to the stem 401 by the reset rod 103. This requires a service man to be on location when flow of fluid at pressure in excess of the normal operating range is encountered.

DECREASE OF PRESSURE BELOW NORMAL OPERATING RANGE

Should flow line pressure decrease below the pre-set operating range as a result of, for example, a pipe line rupture downstream of the flow line valve, pressure in the valve will become substantially zero and pressure within the bonnet stem 201 will go below the low pilot setting, i.e., the force exerted downwardly on the stem 401 and the spool 405 by means of the low pilot spring 383 dominating the differential pressure acting across P-1. In this event, the high pilot spring 381 will not exert a downward force on the pilot stem 401 because the lower end 381B of the spring 381 is shouldered on the high pilot spring washer 382 and onto the pilot spacer 355.

As the spool 405 is urged downwardly by the force exerted through the stem 401 and the spool 405 by the spring 383, the shoulder 414B is relocated with respect to the seat 340 and one of the balls 415 approaches the seat 340 on the low pilot 317. Subsequently, the sealed bleed ball 417 is wiped off of its companion seal 347 of the bleed port 318 by the downward movement of the spool 405 and contact of the ball 417 by the upper shoulder 416B. As flow is initiated through the passageways from the piston high pressure chamber 112 to the piston low pressure chamber 132 and through the passageway 341 within the pilot 317, the later flow causes one of the balls 415 to seek and sealingly engage upon the seat 340 on the low pilot 317.

Since the pressure within the bore 207 of the stem 201 and immediate the spool 405 in the pilot body 305 is isolated from pressure within the passageways between and in the chambers 112 and 132, the pressures therein will equalize and the force exerted by the compressed power and boost springs 227 and 228 together with the force created by the pressure differential acting across T-seals 160 will urge the piston 203 upwardly to close the gate of the gate valve assembly by causing the bonnet stem 201 to be shifted correspondingly upwardly. In this position, it should be noted that three potential differential pressure areas exist along the spool 405. First, there may be a pressure differential across the piston area P-3 resulting from the equalized pressure in passageway 348A in the body 301 and the reduced pressure contained within the passageway 325 below the end 418 of the spool 405. Secondly, a pressure differential may exist across the upper piston area P-1, since the pressure within the chamber 384 is substantially atmospheric. Thirdly, the piston area P-2 may encounter a differential pressure thereacross when the bleed port 318 is opened with the ball 417 being disengaged from its companion seal 347 and when pressure is equalized within the chambers 112 and 132, inasmuch as a ball 415 is sealingly engaged upon its companion seat 340. There is a net piston area increase between the diameter defined at P-1 and the diameter defined at P-2 such that the act of plugging the low pilot 317 by means of one of the balls 415 on the seat 340, together with the removal of the sealed ball 417 from the bleed port 318, transforms the spool 405 from an upwardly urged member to a downwardly acting member. Flow line pressure now acts in a downward direction on the spool 405 and in the same direction as the force exerted by the low pilot spring 383. Accordingly, due to the pressure force reversal, the piston stem 401 and the spool 405 automatically snap to the fully tripped position. Regardless of flow line pressure and regardless of the positioning of the needle supply valve assembly 166, the pilot assembly P cannot automatically reset because its net hydraulic piston effect is in the downward direction. Thus, pressure within the flow line and the bore 207 may be returned to the normal operating range, increased thereabove, or dropped to zero, but the spool 405 will stay in the down position because of the differential pressure exerted across the innermost piston area P-2. Consequently, the pilot assembly P of the actuator A will not reset automatically after a low pressure environment is sensed. Thus, the pilot assembly P will not become functional after pressure within the flow line rises to within the normal operating range subsequent to a decrease therefrom, and the gate of the gate valve will remain in closed position.

The non-automatic reset feature of the pilot assembly P after a sensing of pressure decrease below normal operating range is critical to the fail safe operation of the actuator A. Gate valve mechanisms are sealingly engaged onto their seat on the downstream flow side of the flow line within the valve body. The gate is moved to the far or downstream seat seal because of pressure differential. Pressure under and within the bonnet stem 201 and within a closed gate valve is always defined by the pressure upstream of the gate valve assembly. If the flow line ruptures downstream of the gate valve, pressure within the valve body will go to substantially zero, and the pilot assembly P will sense the decrease in pressure below the normal operating pressure as defined by the setting of the spring 383. Upon closing of the gate valve head onto its seat, pressure within the gate valve and upstream of the valve assembly will return to normal and pressure within the bonnet stem 201 also will return to normal. However, pressure downstream of the gate valve will be below normal. If the actuator A and pilot assembly P were not designed to be nonautomatically resettable when decrease in pressure is sensed below normal operating pressure, the pilot assembly P would reset and the bonnet stem 201 would be shifted to the down position to open the gate, even though pressure downstream in the flow line is below the normal operating range. Since the rupture downstream would not have been repaired, there would exist a continuous state of oscillation of the gate valve alternately sensing low and normal pressure environments.

It is important to note that the non-automatically resettable feature from low pressure condition to normal operating range within the actuator A is accomplished hydraulically and internally of the actuator A without primary or secondary mechanical operations, such as the manipulation of a detent pin, or the like.

CALIBRATION OR REPAIR OF ACTUATOR OR PILOT WHILE MAINTAINING GATE IN CLOSED POSITION

As a safety feature, the actuator A is designed such that the gate of the flow line valve automatically will be shifted to closed position in the event that the actuator A is disassembled to remove the pilot assembly P to calibrate or repair it. To remove and repair the pilot assembly P, the plug 131 is removed from its bore 130 to allow subsequent venting of pressure within the lower chamber 132, and the stem protector 101 is manually manipulated off of the threads 105. As shown in FIG. 9, the pilot assembly P is thereafter manually rotated to disengage it from the threads 219 on the piston 203, and the relative upward movement of the pilot assembly P in relation to the piston 203 causes the O-ring 307 to slide upwardly along the smooth piston wall defining the passageway 222A which is in communication with the port 222, until such time as the O-ring 307 travels into the passageway 231 thereabove which has a larger internal diameter than that of the passageway 222A therebelow. High pressure within the chamber 112 immediately is transmitted through the flow passage 203A within the piston 203, through the passages 231 and 222A, thence through the port 222 and into the chamber 132 to equalize the pressure in the chambers 132 and 112 and permit the power and boost springs 227 and 228 and the differential pressure acting across the T-seals 160 to create a force to shift the piston 203 upwardly and close the gate. While the pilot assembly P is being manipulated off of the threads 219, the end 312 of the pilot check 310 travels upwardly, and the compressed force defined within the spring 212 in the union 210 urges the ball 214 toward and sealing engagement on its valve seat 215 in the piston 203 to contain flow line pressure within the bore 207 of the bonnet stem 201. Further manipulation will cause pressure to be transferred between the chambers 112 and 132 and vented to atmospheric pressure through the open port 130 because the O-ring 307 is caused to come out of its sealing bore in the passageway 222A.

Thus, flow line pressure is contained within the actuator A and the gate is shifted to closed position, but the pilot assembly P is completely removable from the actuator A for repair or replacement purposes.

To replace the pilot assembly P, the procedure as above described is conducted in reverse order and the start up procedure as outlined above may be initiated.

The actuator A may be disassembled while in operation on the flow line with the gate valve in closed position, with the pilot assembly P being disengaged from the piston 203, or remaining threadedly secured thereon. The housing 101 is threadedly disengaged from the member 104 at threads 105, and the stem 103 removed and inserted within the transverse bore 107B and rotational force applied therethrough to remove the member 104 from the housing 116 therebelow at the threads 115. Because of the operational association of the bore 119, the O-ring 117 and the threads 115, pressure within the chamber 112 will be vented through the port 119 before the members 104 and 116 are completely unthreaded at threads 115. The housing 116 is disengaged from the housing 125 at threads 124, with pressure contained within the chamber 132 being vented through the port 120 before the housing 116 is completely disengaged from the member 125 at threads 124. Upon complete removal of the housing 116, the pilot assembly P and the inner body 200 of the actuator A may be removed from within the housing 125 by disengaging the inner body 200 from the bonnet stem 201 at the threads 202, the removal of the pilot assembly P in this fashion permitting the ball 214 to become sealingly engaged upon its seat 215 to contain flow line pressure therebelow and within the actuator components. Thereafter, the housing member 125 may be removed from the bonnet ring 139 at the threads 138, pressure within the chamber 159 immediately therebelow being vented first through the port 121 prior to complete disengagement of the members 139 and 125 at the threads 138. The bonnet ring 139 then may be disengaged from the base 155 at the threads 145, the port 144 permitting venting of pressure thereunder prior to complete disassembly of the parts 139 and 155 at the threads 145. The packing cartridge 158 then is removed by sliding it upwardly along the exterior of the bonnet stem 201 until its lower end passes above the upper end of the stem 207. Thus, as shown in FIG. 8, all of the actuator parts except the base 155 and the bonnet stem 201 may be completely removed therefrom, but pressure within the flow line still will be contained by the "fire seal" by means of seating and sealing engagement of the O-ring 231 onto its seat 205A. Pressure is prevented from passing through passageway 170 to passage portion 172 transversely thereof by the closed position of the control needle valve assembly 166.

The control needle valve assembly 166, as well as the bleed needle valve assembly 174, each may be manipulated out of and removed from the body 155. Additionally, each of the seal seats 184 and 152 also may be removed for repair or replacement purposes. Upon removal of the supply needle valve assembly 166, the ball 147 in the check valve 146 is caused to become sealingly engaged on its seat 148 as the end 153 and the seal seat 152 are moved longitudinally upwardly and out of the base 155. The compressive force defined through the spring 149 will retain the ball 147 in sealing engagement upon its seat 148 to control flow line fluid and prevent its communication thereabove.

OPTIONAL EMBODIMENTS

In order to test or initiate actuation of the actuator A utilizing a hand pump mechanism, an optional relief valve member 420 may be inserted within the longitudinal passageway 351, as shown in FIG. 10. This valve 420 functions to permit activation of the pilot assembly P and actuator A to open the gate valve even though no pressure is contained within the flow line. It is necessary for all gate valves to be in the "open" position to permit a pig to travel completely through the flow line before initial utilization of the flow line to check for leaks, sweep out cuttings, and the like. The valve 420 within the passageway 351 prevents reverse flow through the pilot assembly P up to a predetermined or relieving pressure, which is typically set at a pressure sufficient for pressure to act on the piston head 217 to overcome the power and boost springs 227 and 228. It is obvious from the above disclosure that all flow and pressure activating the pilot assembly P is transmitted through the passageway 311 of the pilot check 310 to and from the bore 207 of the bonnet stem 201 therebelow, and never from above the pilot check 310 to and into the bore 207.

The relief valve 420 is manipulatable within the passageway 351 in both upward and downward directions. When pressure and flow are carried upwardly within the passageway 351, the upward travel of the relief valve mechanism 420 is prevented by the top thereof shouldering on the lower face of the pilot spacer 355. Downward travel of the relief valve 420 within the passageway 351 is prevented by the outwardly extending shoulder of the relief valve 420 engaging the upper end of the pilot body 301. When fluid flow is transmitted upwardly within the passageway 351, fluid travels around the relief valve 420 and exterior of the O-ring 421. However, when pressure is applied through the piston assembly P thereabove, such as by hand pump, the relief valve 420 is shifted downwardly within the passageway 351 and the O-ring 421 sealingly is engaged within the bore of the passage 351. Pressure may be applied within the pilot assembly P until such time as the compressive force defined through the spring 425 engaging the ball 423 onto its seat 424 is overcome and the ball 423 becomes sealingly disengaged from its seat 424 to permit fluid to be transmitted through the port 422.

To manually manipulate the actuator A to shift the bonnet stem 201 downwardly to open the gate valve, the start up procedure described above is conducted and the plug 123 within the upper housing 116 is threadedly disengaged therefrom and a hand operated pressure pump is threadedly and sealingly engaged within the port 122. As the pump is manipulated, pressure within chamber 112 is increased, and, although it is permitted to travel and communicate through the flow passage 229A, 229, and within the passageways immediate the spool 405, the pressure is contained within the pilot body 301 by the valve 420 within the passageway 351 being in sealing engaged position. Accordingly, the upward force contained within the power and boost springs 227 and 228 acting on the piston 203 is overcome and the piston 203, together with the bonnet stem 201 and the gate of the gate valve are shifted downwardly to open the gate valve.

The high-low pressure sensing tripping operation of the pilot assembly P is not affected by the presence of the optional valve 420 within the passageway 351 because the forces acting on the respective piston areas P-1 and P-3 on the spool 415 are not affected, the effective piston areas P-1 and P-3 being substantially equal. This optional feature eliminates the necessity of opening the gate valve by mechanical means such as external power screws to force the stem 201 in the downward direction.

In a further optional embodiment, a fusible plug element (not shown) may be inserted within the port 122 to replace the plug 123. The plug element may be of conventional construction, having therein a eutectic alloy substance which is permitted to bleed out of ports within its housing, or otherwise, when the melting temperature of the eutectic alloy is encountered surrounding the exterior of the fusible plug. Thereafter, the plug permits high pressure contained within the chamber 112 to be vented to atmosphere through the ports or otherwise within the fusible plug element to permit the piston 203 to be shifted to the up or closed position such that the gate valve is closed. In detail, the melting of the eutectic alloy and the sudden relief of pressure in the chamber 112 results in a differential pressure defined across piston area P-2 which, in turn, causes the pilot spool 405 and the stem 401 to be shifted downwardly so that one of the free balls 415 is allowed to be sealingly engaged onto its seat 317 and the sealed ball 417 of the bleed port 318 thereafter is wiped off of its seat 347 to permit fluid to travel within the bleed port 318 and within the passageway 348A from the port 348, and also downwardly from the chamber 112 to close the actuator. The movement of the spool 405 duplicates the pilot manipulation without creation of a pressure condition below the normal operating range in the valve body, and the spool 405 is not automatically resettable.

As a further optional embodiment, a device may be positioned within the port 122 after removing the plug 123 to permit remote control of reduction or increase in pressure within the chamber 112 and the valve may be triggered to close as with the fusible plug, described above.

As an additional and further optional embodiment, the filter 208 may be eliminated and a free floating piston 233, as shown in FIG. 7, may be added within the bore 207 of the bonnet stem 201, the piston element having a circumferentially extending O-ring 234 within a grooveway 235 defined thereon to prevent fluid communication between the floating piston and the bonnet stem 201, the O-ring exterior slidable along the smooth interior of the stem 201 above an elongated bore 236. The bore 236 has an internal diameter slightly in excess of the internal diameter of the stem 201 thereabove to permit escape of pressure and fluid within the stem 201 thereabove when compressed force defined within a spring element 238 below the piston 233 is overcome. The bore 236 prevents sealing of the piston 233 in a fully down or displaced position which would prevent the pilot assembly P sensing a pressure condition below the normal operating range. The force defined within the spring 238 is sufficient only to levitate the piston 233. When the free floating piston assembly 233 is optionally utilized, the stem 201 must be separated into two component parts, because of the utilization of the bore 236, the parts being secured at the threads 237. The utilization of the floating piston would, of course, still make the actuator A self-operational and not dependent upon secondary or remote activation or manipulation and would further enable particular use of the actuator A in contaminated fluid environments which would otherwise make utilization of the filter 208 undesirable because of relatively quick particulate contamination and clogging of the filter pores therein. Use of the floating piston 233 would necessitate initial activation by applying a hand activated pressure pump within the port 122 and applying pressure within chamber 112, as described above.

As pressure is increased, the compensating piston 233 will be urged downwardly within the bore 207 until it runs out of the seal bore 236. The pump is removed from the port 122 and the plug 123 is sealingly engaged therein. Now, fluid and pressure within the flow line below the compensating piston will act on the lower end thereof and, upon increase or decrease of pressure below the compensating piston than the amount held by the compensating piston within the bore 207, the piston 233 will be moved upwardly or downwardly to transmit force and pressure to act on the piston area P-1 to initially activate the pilot P and the actuator A to either open or close the flow line valve, depending upon the increase or decrease of pressure transmitted across the compensating piston 233.

The pilot assembly P may be calibrated prior to incorporation into the actuator A by removing the pilot check 310 from the pilot body 301 and inserting at the threads 309 a hand manipulated pump to simulate flow line pressure. Because the power port 348 contains threads 349, a gauge may be threadedly secured through the power port 348 and the pilot assembly P tripped and reset by means of manipulation of the pump to calibrate and adjust one or both of the springs 381 and 383, the adjustment being made by contraction or expansion thereof by manipulation of one or more of the adjustment bolts 379 and 380.

It should be noted that when the pilot assembly P is being manually reset by use of the reset rod 103 or by use of a hand pump, the lower chamber 132 must be at atmospheric pressure and cannot be in direct communication with flow line pressure in substantial excess of atmospheric pressure because the piston 203 cannot move downwardly if the chamber 132 is pressurized.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A flow line valve actuator respondable to a source of fluid pressure for moving an operative means of a valve between open and closed position, comprising: a housing defining a bore therethrough; a shaft carried in said housing and engagable with said operative means; piston means carried by one of said shaft and said housing and sealingly slidable along the other of said shaft and said housing and longitudinally movable within said cylindrical bore; first and second fluid chamber means companionly associated with said piston means yielding a differential force across said piston means upon increase of fluid pressure within one of said chamber means, said shaft being selectively shiftable longitudinally in a first direction to move said operative means to one of open and closed position by increase in fluid pressure within one of said first and second fluid chamber means, said shaft being selectively shiftable longitudinally in a second direction to move said operative means to the other of said open and closed position upon subsequent decrease in fluid pressure in one of said first and second chamber means and upon increase of fluid pressure within the other of said first and second chamber means; pilot means within said housing having valve seat means thereon; normally free traveling spherical members immediate said pilot means defining valve head means and selectively sealingly engagable on said pilot means to open and close said pilot means to control fluid flow therethrough; and pilot spool means within said housing immediate said pilot means and operably associatable with said pilot means and said spherical members to permit selective engagement of said spherical members onto said valve seat means of said pilot means, said spool means being selectively shiftable in one of linear and rotational directions within said housing immediate said valve head and seat means and not constrained against the other of linear and rotational directions to permit said fluid pressure to act within said actuator to manipulate said operative means between open and closed position upon only one of linear and rotational shifting of said spool means, the selective engagement of said head and seat means being sealingly insensitive to the other of linear and rotational shifting of said spool means.

2. The flow line valve actuator of claim 1 wherein said pilot means is carried on said shaft and within said housing.

3. The flow line valve actuator of claim 1 wherein said spool means is selectively shiftable in response to variation of said fluid pressure.

4. The actuator of claim 1 additionally comprising: stem extension means within said housing and engaged to said spool means; and means within said housing and carried around said stem extension means for resisting travel of said spool means in a first direction.

5. The actuator of claim 1 additionally comprising: stem extension means within said housing and engaged to said spool means; and means comprising at least one compressible spring element within said housing and carried around said stem extension means for resisting travel of said spool means in a longitudinal direction.

6. The actuator of claim 1 additionally comprising: stem extension means within said housing and engaged to said spool means; and means comprising at least one compressible spring element within said housing and carried around said stem extension means for resisting travel of said spool means in an upward direction.

7. The actuator of claim 1 additionally comprising: stem extension means within said housing and engaged to said spool means; means within said housing and carried around said stem extension means for resisting travel of said spool means in a first direction; and differential area means across said spool means responsive to differential pressure to selectively overcome travel resistance of said spool means by said resisting means and to shift said spool means in a second direction.

8. The actuator of claim 1 additionally comprising: stem extension means within said housing and engaged to said spool; means comprising at least one compressible spring element within said housing and carried around said stem extension means for resisting travel of said spool means in a first direction; and differential area means across said spool means responsive to differential pressure to selectively overcome travel resistance of said spool means by said resisting means and to shift said spool means in a downward direction.

9. The actuator of claim 1 additionally comprising check valve means shiftable in a first direction to permit transmission of fluid pressure from said source therethrough in a first direction and sealingly engageable within said passageway member in response to transmission of fluid pressure in a second direction to prevent transmission of said fluid pressure from said source therethrough in a first direction, said check valve means having pressure relief means therein for transmission of fluid pressure therethrough in said second direction while said check valve means is sealingly engaged within said flow passageway member.

10. The flow line valve actuator of claim 1 additionally comprising compensating piston means within said shaft and responsive to at least one of increase and decrease of said source of fluid pressure for operation of said pilot means to manipulate said operative means between open and closed position.

11. The flow line valve actuator of claim 1 additionally comprising static seal means on said shaft and sealingly engagable within said housing to isolate a source of fluid pressure from within said actuator.

12. The flow line actuator of claim 1 further comprising supply valve means for selective communication of said source of fluid pressure within said actuator and bleed valve means within said actuator for venting of fluid pressure within said actuator.

13. The flow line valve actuator of claim 12 additionally comprising check valve means in association with said supply valve means, said check valve means being manipulatable to closed position upon removal of said supply valve means from said actuator housing to isolate said source of control pressure from within said actuator housing thereabove.

14. The flow line valve actuator of claim 12 wherein at least one of said supply and bleed valve means comprises a valve seal set assembly therefor selectively removable from within said actuator housing.

15. The flow line valve actuator of claim 1 wherein said pilot means is reciprocably carried on and selectively disengagable from said piston means.

16. The flow line valve actuator of claim 1 wherein said shaft is automatically shiftable longitudinally in a first to move said operative means to closed position by decrease of said source of fluid pressure within one of said first and second fluid chamber means.

17. A flow line valve actuator respondable to a source of fluid pressure for moving an operative means of a valve between open and closed position, comprising: a housing defining a bore therethrough, a shaft carried in said housing and engagable with said operative means; piston means carried by one of said shaft and said housing and sealingly slidable along the other of said shaft and said housing and longitudinally movable within said cylindrical bore; first and second fluid chamber means companionly associated with said piston means yielding a differential force across said piston means upon increase of fluid pressure within one of said chamber means, said shaft being selectively shiftable longitudinally in a first direction to move said operatively means to one of open and closed position and selectively shiftable longitudinally in a second direction to move said operative means to the other of said open and closed position upon pressure equalization across said piston means; pilot means within said housing having valve seat means thereon; normally free traveling spherical members immediate said pilot means defining valve head means and selectively sealingly engagable upon said pilot means to open and close said pilot means to control fluid flow therethrough; and pilot spool means within said housing immediate said pilot means and operably associatable with said pilot means and said spherical members to permit selective engagement of said spherical members onto said valve seat means of said pilot means, said spool means being selectively shiftable in response to variation of said fluid pressure in one of linear and rotational directions within said housing immediate said valve head and seat means and not constrained against the other of linear and rotational directions to permit said fluid pressure to act within said actuator to manipulate said operative means between open and closed position upon only one of linear and rotational shifting of said spool means, the selective engagement of said head and seat means being sealingly insensitive to the other of linear and rotational shifting of said spool means.

* * * * *